United States Patent [19]

Novas et al.

[11] Patent Number: 5,521,967
[45] Date of Patent: May 28, 1996

[54] METHOD FOR MONITORING TELEPHONE CALL PROGRESS

[75] Inventors: Robert G. Novas, Rockville, Md.; Andy Spitzer, Herndon, Va.

[73] Assignee: The Telephone Connection, Inc., Rockville, Md.

[21] Appl. No.: 224,464

[22] Filed: Apr. 7, 1994

Related U.S. Application Data

[63] Continuation of Ser. No. 712,538, Jun. 10, 1991, Pat. No. 5,325,425, which is a continuation-in-part of Ser. No. 513,857, Apr. 24, 1990, Pat. No. 5,023,906.

[51] Int. Cl.$^6$ .................................................. H04M 11/00
[52] U.S. Cl. ........................ 379/100; 375/112; 375/286; 358/434; 358/435
[58] Field of Search ...................................... 379/100, 112, 379/386, 97, 98, 99, 418, 457; 358/435, 434, 498, 441

[56] References Cited

U.S. PATENT DOCUMENTS

| | | | |
|---|---|---|---|
| 4,800,439 | 1/1989 | Yoshino | 379/100 X |
| 4,847,890 | 7/1989 | Solomon et al. | |
| 4,878,239 | 10/1989 | Solomon et al. | |
| 5,057,941 | 10/1991 | Moriya | 358/434 X |
| 5,204,757 | 4/1993 | Agudulo et al. | 379/100 X |
| 5,325,425 | 6/1994 | Novas | 379/100 |

Primary Examiner—Stephen Chin
Assistant Examiner—Paul Loomis
Attorney, Agent, or Firm—Keck, Mahin & Cate

[57] ABSTRACT

A call progress monitor and algorithm for placing a telephone call over the telephone lines. The algorithm is hierarchically arranged having three major routines or portions: tone detection, signal recognition and situation recognition. The tone detection portion of the algorithm measures the power at each of a predetermined number of frequencies of interest. In accordance with one improvement, the data is sampled at a fraction of the rate at which it is supplied, for example, on a T1 channel. The signal recognition portion of the algorithm detects the presence of a particular signal and this stage of the algorithm has been modified to more precisely detect voice. Specifically, power within a voice filter band is compared with power at other predetermined frequencies and a decision is made based on this information. Furthermore, another improved aspect is that data for an entire Epoch is accumulated and stored in a buffer prior to processing as a group. The situation recognition portion of the algorithm determines that a certain sequence or pattern of signals has occurred with a particular timing or cadence.

7 Claims, 14 Drawing Sheets

FIG. 4
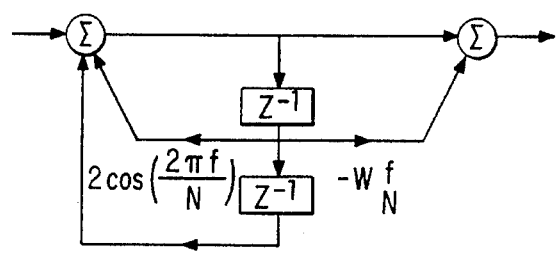
IIR FILTER SECTION SIGNAL FLOW
FIG. 5
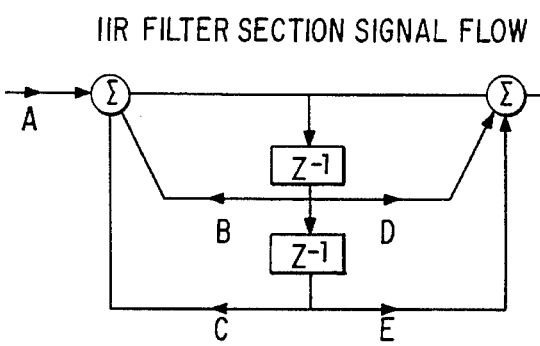
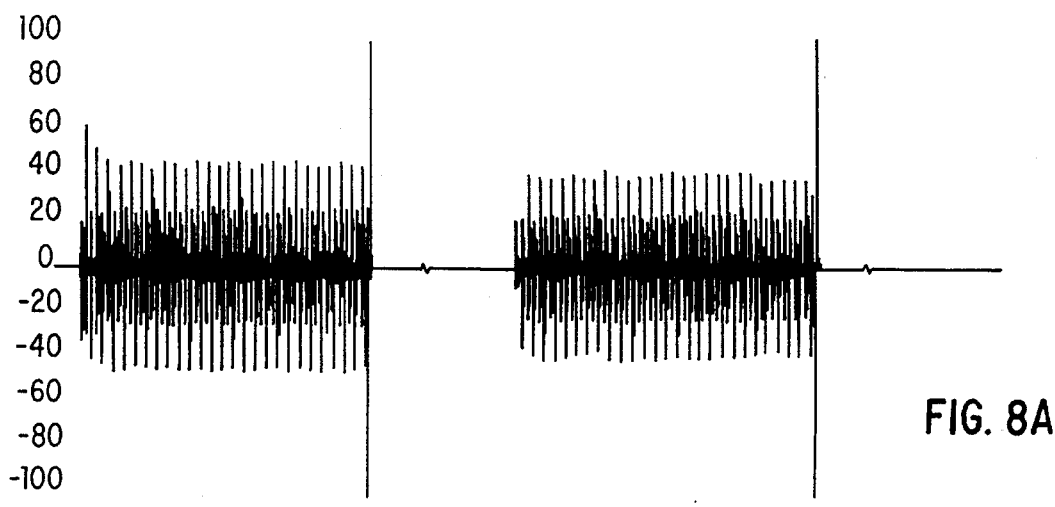
FIG. 8A
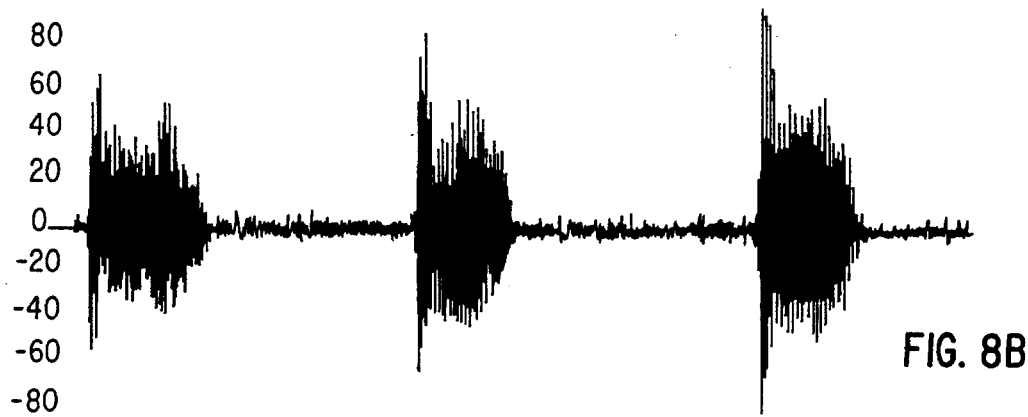
FIG. 8B

METHOD FOR MONITORING TELEPHONE CALL PROGRESS

PRIOR RELATED APPLICATION

This is a Continuation of application Ser. No. 07/712,538, filed Jun. 10, 1991, now U.S. Pat. No. 5,325,425, which application is a continuation-in-part of U.S. patent application Ser. No. 07/513,857, filed Apr. 24, 1990, and entitled A METHOD FOR MONITORING TELEPHONE CALL PROGRESS, now U.S. Pat. No. 5,023,906. The full text and teachings of this prior application are herein incorporated by reference.

BACKGROUND OF THE INVENTION

The present invention relates to a system and method for detecting and discriminating between tone signals and voice particularly on a telephone line.

The prior aforementioned application addresses a need to assist and monitor a computer, such as a telephone network special services switch, placing a telephone call over a telephone network. Specifically, that system and method recognizes and distinguishes the various call progress signals and special information signals, for example, which tell the computer that a particular telephone number is not in service.

It has been discovered that certain telephone systems in common use in the United States and abroad handle particular signals on telephone lines differently. Moreover, certain telephone systems inherently remove certain low frequencies that are useful in detecting and discriminating voice from other signals. The present invention relates to an improvement in the basic system and algorithm of the prior application and, in particular, to a modified voice detection scheme as well as other processing speed enhancement aspects.

SUMMARY OF THE INVENTION

It is a primary object of the present invention to provide a system and method for detecting and discriminating audio signals and particularly signals indicative of the progress of a telephone call made by an automated device, such as a computer.

It is another object of the present invention to provide a system and method for monitoring the progress of outgoing telephone calls placed by an automated device, by detecting the power level and cadence of audible call progress signals.

It is a further object of the present invention to employ a down-sampling technique whereby every other sample of data supplied is processed so as to enhance processing speed on machines which run the algorithm.

It is still another object of the present invention to employ first-in, first-out (FIFO) buffering of each sample of audio data as it becomes available to accumulate sufficient data for processing as a group. Such data buffering prevents potential "run over" in processing data in real-time as a constant new stream of data becomes available.

The call progress monitor method according to the present invention is embodied as a computer algorithm run on a digital signal processor (DSP) or high powered personal computer. The algorithm is hierarchically arranged having three major routines or portions: tone detection, signal recognition and situation recognition.

For detecting signals on a telephone line, the machine running the call progress monitor algorithm is interfaced with telephone audio data and also receives as input certain commands and preset definitions. Based upon the definitions stored in a memory and the commands, the call progress monitor algorithm is applied to the telephone audio data.

Specifically, the call progress monitor algorithm is controlled by a host computer which sends a Recognize Situation Command and expects to receive some time later, a Recognize Command Termination Report. Thus the call progress monitor is commanded to recognize a situation, applies the call progress monitor algorithm to the telephone audio data and replies with a Recognize Command Termination Report based upon the results obtained by the algorithm. In addition, the algorithm also can report in intermediate event reports which are intermediate recognition milestones.

In accordance with one aspect of improvement over the basic algorithm disclosed in the prior application, the audio data is sampled at half the rate that it is supplied on the line. This reduces processing but not performance.

According to another aspect of improvement, the sampled data is stored in a buffer memory on a FIFO basis until an entire Epoch (25 milliseconds) of data is accumulated. As a result, incoming data can be stored while previously sampled data is processed, thus avoiding run over within the time allotted by one Epoch.

The tone detection portion of the algorithm measures the power at each of a predetermined number of frequencies of interest and is implemented on each sample of an Epoch in the buffer after an Epoch's worth of data has been accumulated. The signal recognition portion of the algorithm detects the presence of a particular signal and is implemented for each Epoch. A signal is a particular tone or set of tones that are uniquely present (while all other tones are absent). Furthermore, a signal has qualifying requirements of signal to noise ratio (SNR), twist, and noise variance, that must be met to define a particular signal. The situation recognition portion of the algorithm determines that a certain sequence or pattern of signals has occurred with a particular timing or cadence.

Tone detection includes the step of decompressing the telephone audio data (already supplied in digital format) to a 32-bit floating point number, determining the power at a predetermined number of frequencies of interest using a digital filtering routine (via a modified Goertzel algorithm), estimating the total power of the telephone audio data, and normalizing the power at each of the frequencies of interest relative to unity. Like all of the steps in the call progress monitor algorithm of the present invention, each of the steps in the tone detection portion of the algorithm are implemented by computer code executed in a DSP.

The tone detection portion of the algorithm generates as output a normalized tone power vector which is a vector having components corresponding to the normalized power at each of the predetermined frequencies, a normalized tone reference power indicating the total power over all of the predetermined frequencies, and the total power of the incoming telephone audio data.

The signal recognition portion of the call progress monitor algorithm is also run for each Epoch of data and accepts the output of the tone detection portion of the algorithm to produce, as an output, the name of the signal that best matches the input data. Consequently, the signal recognition portion also receives as input signal definitions corresponding to the name of the signals that can possibly be recognized. In accordance with a further improvement, as an initial step, the total power in an Epoch is compared with a threshold. If the total power is less than a threshold, then it is declared that silence is present. No further signal processing is needed for signal recognition. Otherwise, the total power captured by a plurality of Goertzel filters is computed and compared with the total power captured by a low pass filter having a cut-off at 800 Hz. The lowpass filter is dedicated to detecting voice. If the power captured by the low pass filter is less than the total power captured by the Goertzel filters, then normal signal matching is performed. Otherwise, the total power of the current Epoch and the previous Epoch is compared. If the absolute value of this difference exceeds a threshold, it is declared that voice is detected. Otherwise, it is declared that an unknown signal is detected.

The situation recognition portion of the call progress monitor algorithm is run every Epoch for each situation to be recognized and is implemented in the same manner as described in the prior application.

The above and other objects and advantages will become more readily apparent when reference is made to the following description taken in conjunction with the accompanying drawings.

BRIEF DESCRIPTION OF THE DRAWINGS

FIG. 4 is a diagram illustrating the signal flow of a Goertzel algorithm for performing the digital filtering of the filters in the digital filter bank/power spectrum estimator shown in FIG. 3.

FIG. 5 is a block diagram illustrating the signal flow of one section of a cascaded two section infinite impulse response low pass filter used in the voice filter/detector portion of the digital filter bank/power estimator of FIG. 3.

FIGS. 8A–8B are graphical illustrations showing the process by which voice is discriminated from unknown/noise, according to the modified signal recognition stage shown in FIG. 6.

DETAILED DESCRIPTION OF THE DRAWINGS

OVERVIEW OF THE CALL PROGRESS MONITOR

Figure 1:
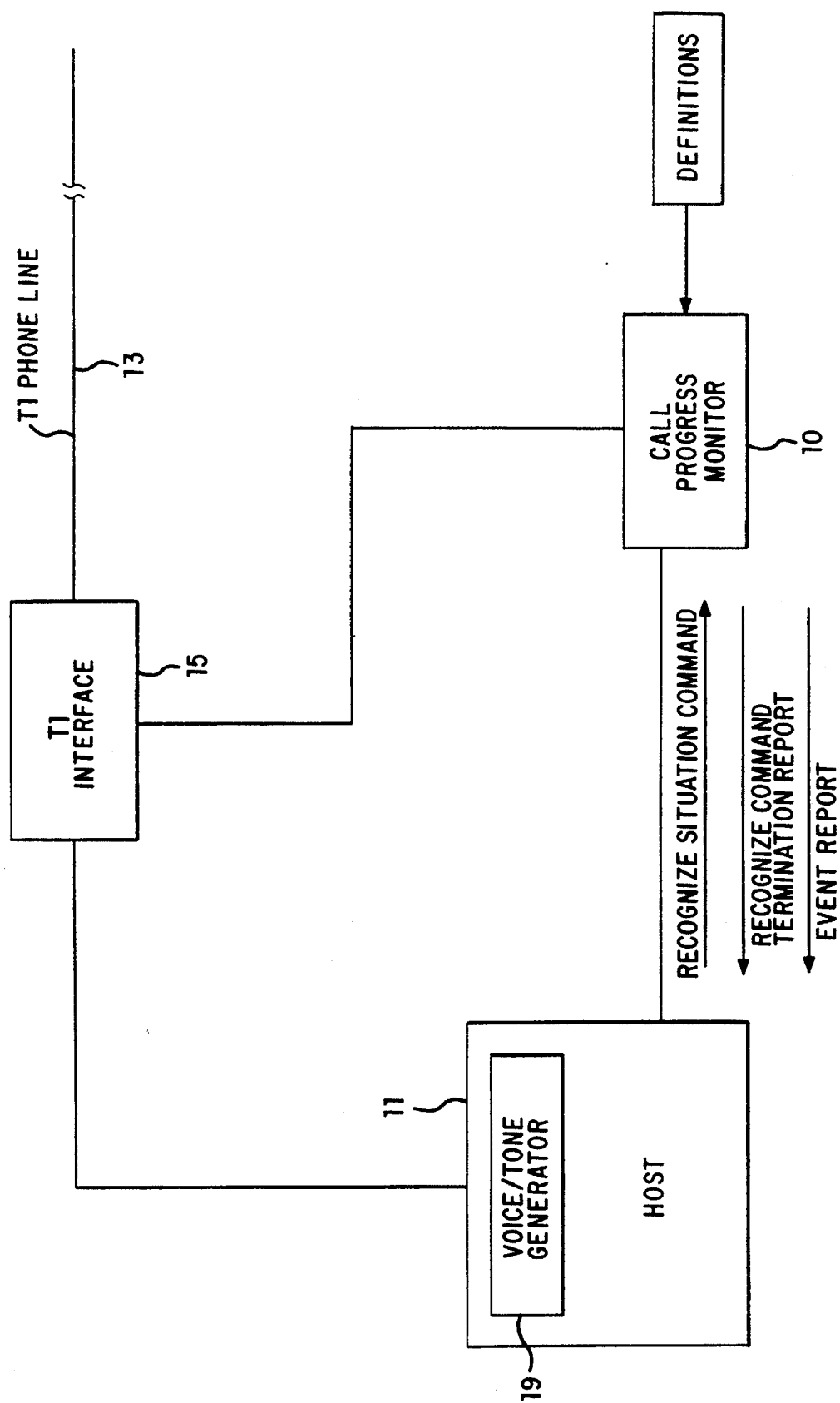
FIG. 1 is a block diagram illustrating the call progress monitor according to the present invention in its functional environment.

Referring first to FIG. 1, the call progress monitor according to the present invention is generally shown at 10. The call progress monitor 10 receives as input telephone audio data and based upon certain definitions stored in a memory, applies a call progress monitor algorithm directed by the various definitions to the telephone input audio data. The monitor 10 is commanded to recognize a situation and applies the call progress monitor algorithm to the telephone input audio data and replies with a recognized command and/or a termination report based upon the results obtained by the algorithm. In addition, the algorithm also can report in intermediate event reports which are intermediate recognition milestones.

The call progress monitor 10 is designed to be used with a T1 digital telephone system. As is well known in the art, T1 is a digital transmission link with an information capacity of 1.544 Megabits per second using a pair of normal twisted wires. A T1 system, shown at 13 in FIG. 1, accommodates 24 channels or time slots of 8 bits each. Consequently, 24 simultaneous and distinct channels of information or voice conversations can be carried by a single T1 transmission line. The 8 bits for each channel is obtained by a compander and pulse code modulation (PCM) analog-to-digital converter, which are well known in the art. Each 8 bits of information per channel is assigned a particular time slot and the 24 channels are transmitted over the line by a technique known as time division multiplexing.

The call progress monitor 10 of the present invention is capable of processing 24 channels of data. This means that the call progress monitor can process 24 calls or one T1 telephone line. Likewise, the host 11 is capable of interacting with the T1 telephone line 13 and handling up to 24 different telephone calls or conversations. Further details of the T1 telephone as they relate to the present invention are well known in the art and can be found in the prior application.

The call progress monitor 10 is used in conjunction with a host machine 11, such as a microprocessor or computer. The host 11 issues Recognize Situation Commands to the call progress monitor 10 and receives Recognize Command Termination Reports (and possibly Event Reports) generated by the algorithm implemented by the call progress monitor 10. The host 11 includes a voice/tone generator 19 for generating the tones necessary for dialing a telephone number and also for communicating preset voice messages to a person waiting to be connected to another person who is being dialed by the host, as will be explained in more detail hereinafter.

For example, to out-dial on a telephone line 13, a software algorithm in the host 11 interacts with the off hook unit 17 of the T1 interface 15 and places a particular channel in the T1 telephone line 13 "off-hook", and subsequently commands the call progress monitor 10 to recognize dialtone (or its absence). The call progress monitor 10 monitors the signal activity on that particular channel on the T1 telephone line and notifies the host algorithm of the presence or absence of dialtone by means of a Recognize Command Termination Report. If the call progress monitor 10 reports the presence of dialtone, the voice/tone generator 19 of the host 11 dials the desired telephone number, typically by placing Dual Tone Multiple Frequency (DTMF) signals on the line. The host algorithm then commands the call progress monitor to recognize the outcome of the telephone call. One possibility is that the telephone is picked up and answered. Other possibilities include a busy signal, or a ringing signal with no answer. These outcomes are also reported to the host by the call progress monitor in a Recognize Command Termination Report. If the outcome is that a voice is detected followed by a preset period of silence, the call progress monitor 10 notifies the host 11, so that the host can put speech on the channel at the appropriate time or connect a waiting person to that particular channel.

It is to be understood, that when the term telephone line is mentioned hereinafter, it is to include a particular channel on a T1 digital telephone line, as well as a conventional analog telephone line.

The term situation is central to the operation and understanding of the call progress monitor according to the present invention. A situation is a sequence of particular signals which are indicative of a particular step in a sequence of steps for placing a telephone call. For example, one situation could be to listen for a dialtone and acknowledge the detection of a dialtone, but if anything out of the ordinary is heard, also acknowledge the occurrence of such extraordinary signals.

In its most simplified form, placing a call typically uses two situations. The first situation is to recognize the presence of a dialtone on a telephone line. This situation is performed when a telephone line is first picked up since a telephone call should not be dialed unless there is a dial tone on the line. When the call progress monitor is initiated by a recognize dialtone situation command to recognize the presence of dial tone, the recognized dial tone situation terminates with a success status when dial tone is detected and terminates with a fail status if dial tone is not detected within a predetermined period of time (or if any other signal is detected).

The second situation is to recognize telephone pickup. In this case, when the call progress monitor is initiated by a recognize situation command to recognize telephone pickup, the situation terminates with a success status when voice is detected followed by silence. For example, if the party answering the telephone call says "Hello?", the situation terminates a short time after the end of the "Hello" utterance. Studies have shown that residential telephones are typically answered with a 0.5–2 second utterance; business telephones answered with a 2–5 second utterance; and answering machines answered with a 5–15 second announcement.

The second situation detects and measures the voice duration (up to a significant pause) to allow each type of answering party/line to be distinguished. The second situation terminates with a fail status if a busy signal or a special information signal is recognized. Furthermore, the type of signal causing the fail termination is identified. The situation also terminates with a fail status if ringing is not detected to be present if, for example prior to pickup, the telephone line has gone dead.

The above described situation definitions are typical examples. The call progress monitor algorithm according to the present invention accepts definitions of various kinds as data so that modifications can be made to the definitions without requiring change in the algorithm.

Figure 2:
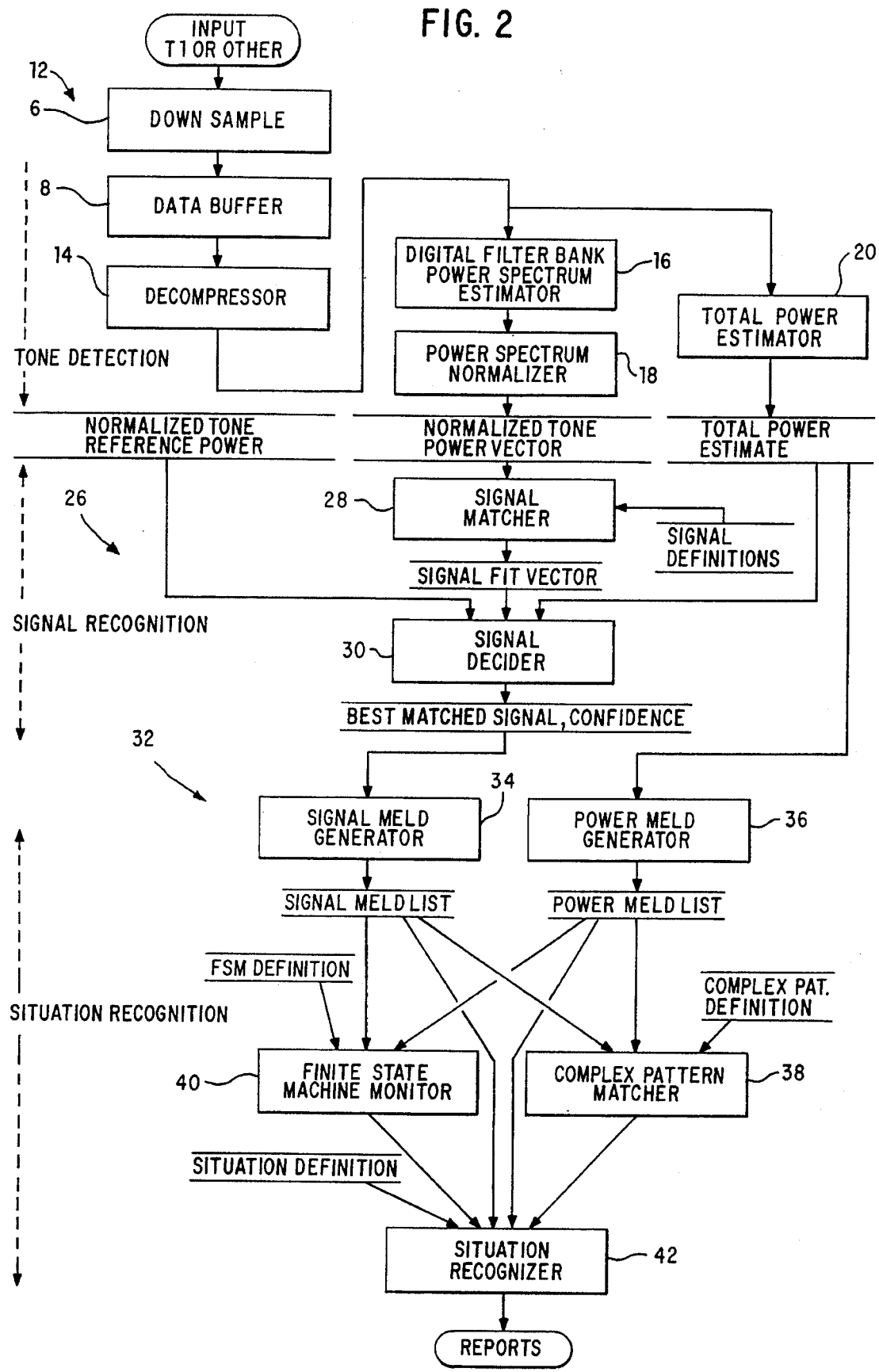
FIG. 2 is a flow chart illustrating the signal flow of the call progress monitor algorithm according to the present invention.

The signal flow through the call progress monitor algorithm is shown in detail in FIG. 2. The algorithm is hierarchically arranged having three major layers: tone detection, signal recognition and situation recognition. The algorithm shown in FIG. 2 is performed by software and can be implemented in a conventional but powerful personal computer or more preferably in a digital signal processor such as the DSP-32C Processor by AT&T. Furthermore, data required for and generated during implementation of the algorithm is stored in a memory forming a part of the call progress monitor.

Briefly, the tone detection portion of the algorithm measures the power present at each of a predetermined number of frequencies of interest. The signal recognition portion of the algorithm detects the presence of a particular signal. A signal is a particular tone or set of tones that are uniquely present (while all other tones are absent). Furthermore, a signal has qualifying requirements of signal to noise ratio (SNR), twist, and noise variance, that must be met to define a particular signal. The situation recognition of the algorithm determines that a certain sequence or pattern of signals has occurred with a particular timing or cadence.

As mentioned above, the call progress monitor 10 is embodied as a computer program containing code and data that execute in a digital signal processor (DSP) such as the AT&T DSP-32C. A single DSP-32C running at 50 MHz with 32K 32-bit words of zero-wait state memory can execute the call progress monitor algorithm on 24 channels of pulse code modulated (PCM) data simultaneously. Consequently, a typical T1 type digital telephony channel provided by a telephone service which comprises 24 channels, can be processed by a single DSP-32C.

In accordance with one aspect of the present invention, two preliminary processing steps are provided prior to tone detection for increasing processing speeds. First, as shown at step 6, if the input data is T1 digital data, the data is sampled at a rate slower than that at which it is provided, as implied by the term "down sample". T1 digital data, as it now is being provided by local telephone companies, is provided at 8,000 samples/second. However, it has been found that sampling the T1 data at half this rate, 4,000 samples/seconds provides adequate information for processing purposes and also reduces processing repetition by one-half. This scheme, which will hereinafter be referred to as "sub-sampling" has associated with it aliasing effects. These aliasing effects are taken into account and exploited in the subsequent stages of the algorithm, as will become more apparent hereinafter.

According to another aspect of the invention, data that has been down sampled is stored in a buffer memory at step 8 on a FIFO basis, until enough data to fill one Epoch is accumulated. Once an entire Epoch of data is accumulated, the tone detection stage of the algorithm is applied to each sample in the Epoch at which time all the samples of the Epoch are made available. This removes the burden of interrupts and is insensitive to processing for an Epoch running over its allotted time, confined by the size of the buffer memory.

TONE DETECTION

Tone detection is run for every other audio sample supplied by the T1 line. After an Epoch worth of data is accumulated in step 8, the tone detection portion of the algorithm acts on each sample and produces an output for that Epoch. An Epoch is a processing time interval selected on the basis of a number of tradeoffs. In the prior application, an Epoch was defined as 200 samples or 25 milliseconds long. However, in accordance with the present invention, an Epoch comprises 100 samples but still is 25 milliseconds long, as a result of sub-sampling. Fast recognition response time is thereby achieved.

The tone detection portion of the algorithm, generally shown at 12, comprises a decompressing step 14, a digital filter and power spectrum estimating step 16, a power spectrum normalizing step 18 and a total power estimating step 20. Each of the steps 14–20 in the tone detection portion of the algorithm are implemented by computer code executed in a DSP. The decompressing step 14 converts data in 8-bit PCM-coded compressed format (transmitted on a channel of a T1 telephone line) to 32-bit floating point format data that is uncompressed for processing as explained in the prior application. Other types of decompression may be performed such as ADPCM (adaptive pulse code modulation).

The digital filter bank and power spectrum estimator 16 measure the energy present in the input signal at a predetermined number of frequencies of interest. These frequencies are selected to correspond to those signals of interest in a particular situation that is running.

Figure 3:
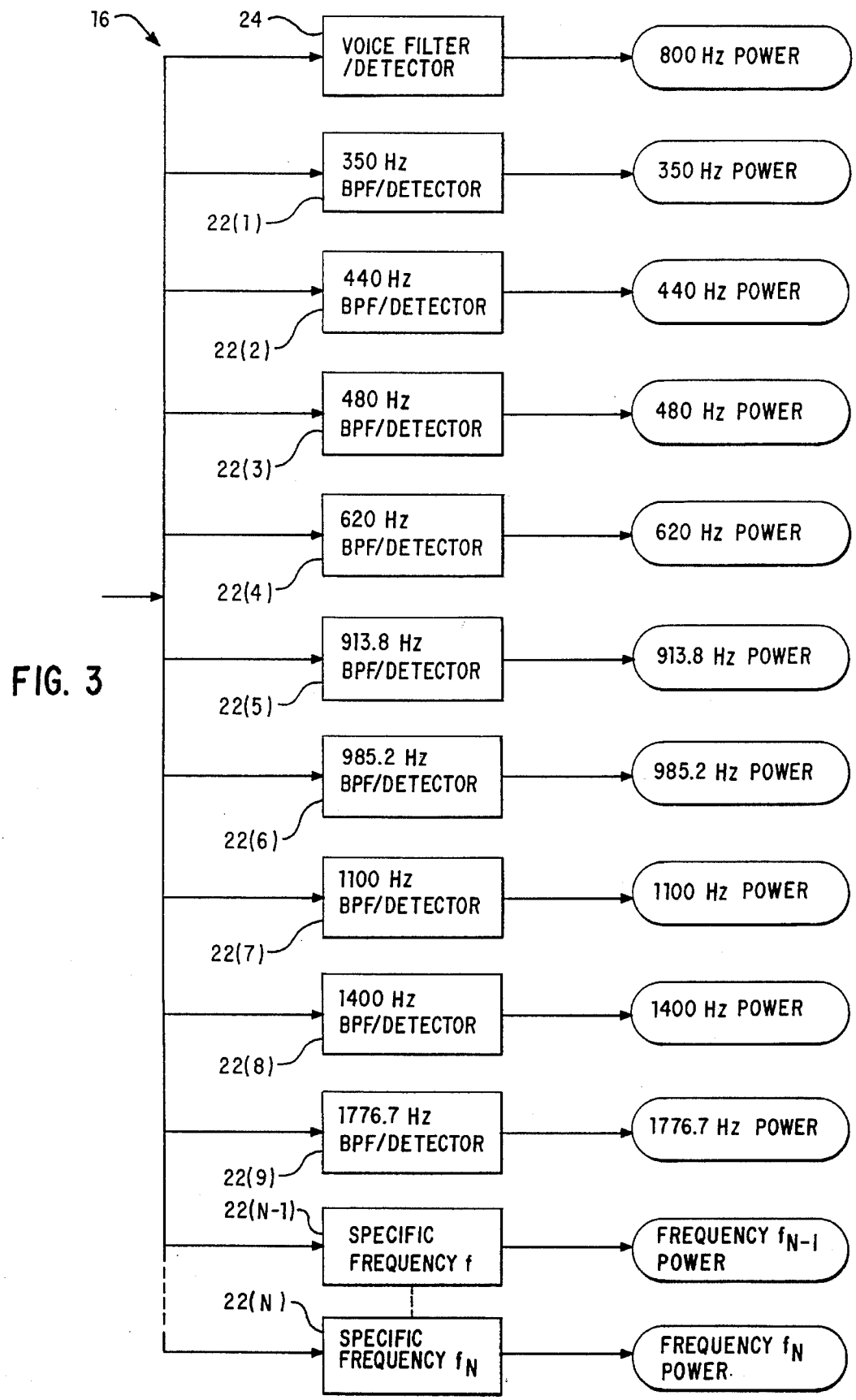
FIG. 3 is a block diagram illustrating the digital filter bank/power spectrum estimator forming a part of the call progress monitor according to the present invention.

FIGS. 3 and 4 illustrate aspects of the digital filter bank and power spectrum estimator 16 in greater detail. In FIG. 3, the digital filter bank 16 and power spectrum estimator is shown including N bandpass filter/detectors 22(1)–22(N) and a voice filter/detector 24. The bandpass filter/detectors 22(1)–22(N) measure the magnitude of the energy present at the N frequencies labeled which are required to recognize the call progress signals ringing, busy, dialtone, special information signals comprised of particular dual tone multiple frequency (DTMF) or multiple frequency (MF) tones, MFR2 tones which are common in European telephone systems and other short duration tones.

A result of the sub-sampling technique is that the Nyquist frequency is 2,000 Hz, rather than 4,000 Hz. By ignoring every other sample and not filtering the alternately sampled data, any frequency components in the original 8,000 sample/second data above the Nyquist limit are aliased into the 4,000 sample/second data. For example, a 400 Hz bandpass filter will respond to signals both at 400 Hz and at the aliased signal of 3,600 Hz (4,000–400). Consequently, the coefficients of the Goertzel filters are adapted for a sample frequency of 4,000 Hz. It is, therefore, possible to reduce the amount of time needed to run the filters, but all the desired frequencies above 2,000 Hz can still be detected by looking for their reflected alias (4,000-f).

The nine bandpass filter/detectors are implemented using the Goertzel algorithm for evaluating the discrete fourier transform (DFT) of the input audio data.

FIG. 4 illustrates the Goertzel algorithm implemented by the present invention in detail. The Goertzel algorithm recursively evaluates the discrete fourier transform of an input signal at a point. Because the Goertzel algorithm is recursive, it evaluates the DFT "on the fly" and does not require that the input samples be stored.

As is well known in the art, evaluating the DFT is not the only way to determine the power at frequencies of interest. There are other ways which are computationally more intense, and therefore are more difficult to use when processing 24 channels of information with a single DSP32-C DSP chip. The Goertzel algorithm was chosen primarily for its computational efficiency. It is to be understood that other means of filtering, such as Finite Impulse Response bandpass filters or Infinite Impulse Response bandpass filters can be used, and indeed, certain of these are technically preferable. However, their processing requirements are greater, and so require either processing fewer channels or the use of faster (or more) DSP.

The Goertzel algorithm shown in FIG. 4 has been optimized for the call progress monitor algorithm of the present invention in a number of ways. The Goertzel coefficients corresponding to each of the bandpass filter/detectors 22(1)–22(N) are listed in Table A2 of the appendix. The Goertzel coefficients have been modified so as to evaluate the DFT at particular frequencies of interest, rather than frequencies that are equal to the sampling frequency k/N, where N is a sample rate and k=0,1,2, . . . ,N/2. In addition, only the left hand side of the Goertzel algorithm is evaluated for each sample in the buffer. The right hand side is evaluated once for an entire Epoch. Since the magnitude of the signals is required, but not the phase, the coefficient $W^k_n$ shown in FIG. 4 (which is the customary notation for the complex-valued coefficient $e^{-j2\pi f/N}$) reduces simply to $2\cos(2\pi f/N)$. Therefore, the Goertzel algorithm is entirely evaluated with real multiplication and addition operations. Finally, the number of samples per Epoch (100) is chosen so that a zero of the Goertzel's system function for the 440 Hz point falls at 480 Hz, and vice-versa. These are the two closest frequencies measured, and therefore the interaction between these frequencies is of greatest concern. Because, as is well known in the art, a zero is a point of maximum signal rejection, the Goertzel algorithm minimizes the interaction of the 440 Hz measurement with the 480 Hz measurement.

The voice filter/detector 24 provides an indication of the presence of voice energy by detecting the energy universally present in vowels in speech. The output of this filter is used both to sense the presence of speech and to prevent "talk off". Talk off is the term for the ability of certain voices to activate the call progress signal recognizer as if a call progress signal were present.

The signal flow of one section of the cascaded two section voice filter/detector 24 is illustrated in detail in FIG. 5. The values of the coefficients are listed in Table A3 of the appendix. The voice filter/detector 24 is an infinite impulse response (IIR) low pass filter with an 800 Hz passband, followed by taking the square root of the sum of the squares of the output of the filter over an Epoch. The IIR low pass filter used in the present invention is a two section filter. FIG. 5 illustrates the signal flow of a single section of this filter, while it is to be understood that two of these sections are to be cascaded. The IIR filter runs for every sample supplied from the buffer and the sum of the squares is computed and maintained. For computational efficiency, the A coefficient is factored out and only applied once per Epoch, when the square root is taken, thereby saving one multiply per sample input.

The output of the digital filter bank and power spectrum estimator 16 is N magnitudes corresponding to the magnitude of power at the N frequencies interest, and the magnitude of power at frequencies less than 800 Hz (the voice filter 24).

Referring back to FIG. 2, the power spectrum normalizer 18 takes the N magnitudes output by the digital filter bank and power spectrum estimator 16 and normalizes them so that the sum of the N values equal 1. In addition, the power spectrum normalizer 18 generates a normalized tone power vector and a normalized tone reference power quantity. The normalized tone power vector comprises N components, each of which corresponds to one of the normalized N magnitudes. Specifically, in the particular example of call progress monitoring, the normalized tone power vector is designated PV and each component in the vector is designated 1 of $PV_1-PV_N$ where $PV_1-PV_N$ correspond to the normalized power at each of the N Goertzel filter frequencies of interest. In this particular example then, the normalized tone reference power is the sum of the original and not normalized nine magnitudes at the frequencies of interest.

The total power estimator 20 produces a total power estimate by finding the square root of the sum of the squares of the samples input in an Epoch. This estimate represents an estimate of the total power, both in-band (measured by the bandpass/detectors and voice filter/detector) and out-of-band of the filters.

SIGNAL RECOGNITION

The signal recognition portion of the call progress monitor algorithm is generally shown at 26 in FIG. 2. Signal recognition is run for every Epoch. The signal recognition portion of the algorithm accepts the output of the tone detection portion of the algorithm and produces, as an output, the name of the signal that best matches the input data. Consequently, the signal recognition portion 26 receives as input signal definitions corresponding to the name of the signals that can possibly be recognized. These signals are listed in Table A1 of the appendix. While only nine signals are listed (aside from silence, unknown and raw high energy), it is to be understood that many more types of signals can be defined and recognized by the call progress monitor algorithm according to the present invention, including Dual Tone Multiple Frequency (DTMF), Multiple Frequency (MF), facsimile machine and other special signals such as the coin "bong" tone used by pay telephones. The signals listed in Table A1 of this application are considered to augment those listed in Table A1 of the prior application. For example, "PAGER" tones and "FAX" tones are defined in the signal definitions in the present application.

Referring to Table A1 in the appendix, each line in the table includes six entries. The entry on the far left of the table is an index value assigned to the signal and the entry next to the index is the name of the signal. The entry on the far right of the table is the frequency of the tone or tones corresponding to that particular signal. The remaining entries are used to describe a particular signal and correspond to actual data that is stored in a DSP or computer as a signal definition. The parameter labeled P-vector includes 10 entries as shown. The P-vector defines which tones are required to be present and which tones are required not to be present for a particular signal to be recognized. The N+1 components in each P-vector corresponds to each of the N measurements in a normalized tone power vector plus the voice filter. To the left of the P-vector are three parameters labeled MinSig, MaxTwist, and MaxVar.

MinSig defines the minimum of the sum of the relative magnitudes of the tones that are required to be present. This parameter is used to require that at least a certain amount of energy measured be present in the tones that compose a signal.

MaxTwist defines the maximum twist allowed for a signal that contains two tones. Twist is the measure of the balance of the magnitude of the two tones, and equals the greater magnitude divided by the lessor. MaxTwist is used to ensure that the tones that compose a two tone signal are substantially equal in magnitude.

MaxVar defines the maximum variance allowed in the magnitude of the tones that are required not to be present, when considering these tones to be N independent random variables. MaxVar is used to define that the tones required not to be present be substantially equal in magnitude.

The signal recognition portion 26 of the call progress monitor algorithm generally comprises two major stages: signal matcher 28 and signal decider 30. Like the tone detection portion of the algorithm 12, the signal matcher 28 and the signal decider 30 are performed by computer code or software subroutines.

The signal recognition portion of the present application represents an improvement over that signal recognition stage disclosed in the prior application. These modifications flow from the fact that the voice filter overlaps with several of the bands covered by the Goertzel filters. First, referring to FIG. 6, the first step 300 of signal recognition is to determine if the total power captured by the filters in the tone detection stage for an Epoch of data is less than a threshold, preferably –50 dB. If so, then in step 310, it is declared that silence exists and no further processing is performed for that Epoch. Otherwise, the total power captured by the Goertzel bandpass filters (referred to here as $G_T$) is compared with the total power captured by the voice filter (referred to here as $V_T$), in step 304. If at step 306, it is determined that the total power captured by the voice filter is less than or equal to the total power captured by all of the Goertzel filters, then the normal signal matching and signal deciding techniques of steps 28 and 30 are used, as shown at step 308. On the other hand, if the power captured by the voice lowpass filter is significantly greater than the power seen in the desired signal ranges, then tones other than the desired ones are present; the signal may be voice.

Figure 7A:
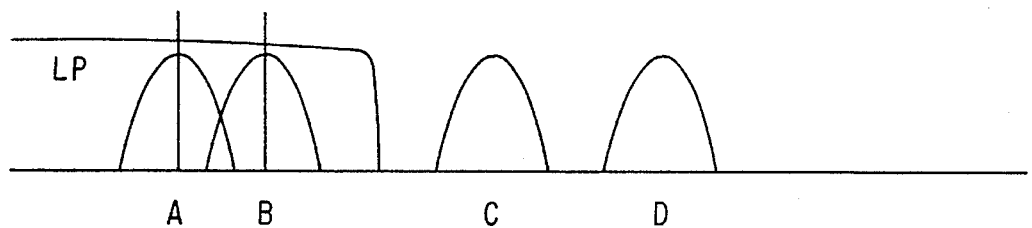
FIGS. 7A–7D are graphical illustrations showing the operation of the modified voice filter/detector in accordance with the present invention.
Figure 7B:
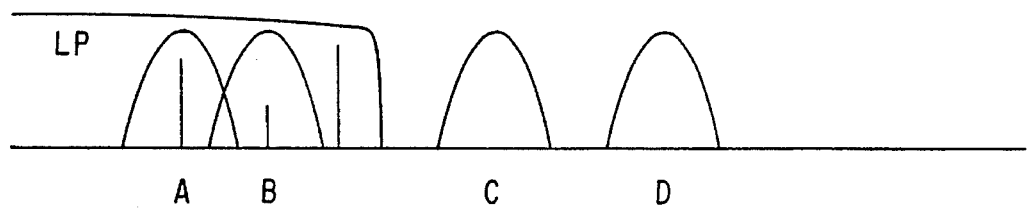
Figure 7C:
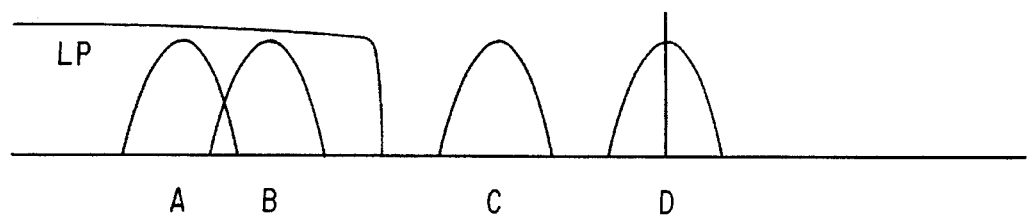

As an example, reference is made to FIGS. 7A–7D. Assume that the signal to be matched is dialtone which has power in the 350 and 440 Hz bands, where "A" and "B" represent 350 Hz and 400 Hz, respectively, and "C" and "D" represent other tones of higher frequencies outside of the passband of the voice low pass filter. With a good dialtone signal, the normalized power captured by the 350 and 440 Goertzel filters will be about 80% of the total raw power. Since the voice low pass filter includes both of these frequencies, the power seen by it should be substantially the same, as shown in FIG. 7A. As shown in FIG. 7B, if, however, there is also a 500 Hz frequency component in the data, then while the 350 Hz and 440 Hz Goertzel filters will capture about 65% of the total raw power (enough to declare dialtone), the voice filter would capture 80% of the power, indicating that the signal is not dialtone, but is either voice or some unknown signal. Therefore, the difference between the power captured by all of the Goertzel filters and that of the voice low pass filter, is compared with a threshold and thereby used to discriminate between a voice (or unknown/noise) and some other signal.

Figure 7D:
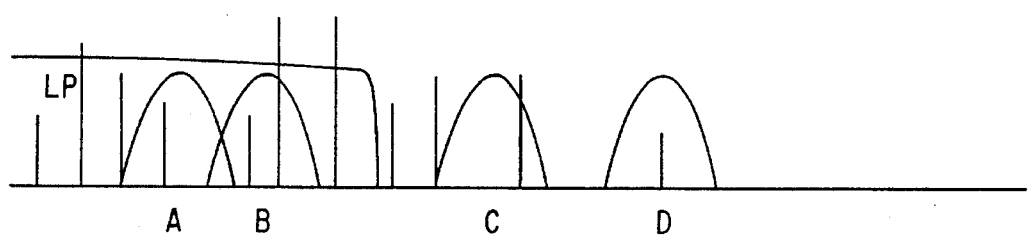

If the signal to be matched, for example, is SIT_3 (1776 Hz tone), then the 1776 Hz Goertzel filter will capture 90% of the total power, while the voice filter will see much less because it cuts off well below the 1776 Hz filter. This is shown graphically in FIG. 7C. FIG. 7D graphically illustrates the possibility in which the signal present is either voice or unknown/noise.

Therefore, to further distinguish voice from unknown/noise, the (absolute value of the) difference between the total power in the current Epoch with that in the previous Epoch is computed in step 312. The absolute value of the difference is compared with a threshold level in step 314. It has been discovered that "noisy" ringback and other "noisy" signals have a rather constant power whereas voice power fluctuates greatly over time. The theory underlying this procedure is graphically illustrated in FIGS. 8A and 8B. Specifically, as shown in FIG. 8A, a fast or noisy signal has substantially the same power in successive Epochs. The power of voice, on the other hand, fluctuates greatly between Epochs as shown in FIG. 8B.

Returning to FIG. 6, if the difference in power between the current Epoch and the previous level is greater than the threshold, it is declared that the signal is voice, in step 316. Otherwise, it is declared that the signal is unknown/noise in step 318.

As described in the prior application, the signal matcher 28 heuristically compares the normalized tone power vector to a set of signal definitions and produces a measure of fit in terms of a signal fit vector, between the input normalized tone power vector and each signal definition. The signal decider 30 examines the signal fit vector, the normalized tone reference power generated by the power spectrum normalizer 18, and the total power estimate generated by the total power estimator 20 and decides which signal best matches the input data, and also produces a measure of confidence in this decision.

The signal matcher 28 looks for energy to be present in particular tones and absent in other tones about which it has information as made available in the signal definitions. To do this, the signal matcher 28 compares the normalized tone power vector to a set of signal definitions, listed in Table A1 and previously described. As mentioned above, the output of the signal matcher 28 is a signal fit vector. There are as many entries in this vector as there are signals defined. For the particular application of the present application, there are nine entries in this vector, one for each line in Table A1. Each entry is the measure of fit between the data input during the Epoch and the corresponding signal definition. The measure of fit equals 0 (i.e., there is no fit) if any of the following conditions is true:

If the sum of the relative magnitudes of the tones that are required to be present is less than MinSig.

If the signal being fit is a two tone signal, and if the twist (the greater magnitude divided by the lesser) is greater than MaxTwist.

If the variance of the signals that are required to not be present is greater than MaxVar.

If none of these conditions is true, the measure of fit is computed as the sum of the relative magnitudes of the tones that are required to be present divided by MinSig plus the inverse of the twist (twist is set to be 1 for a single tone signal) minus the variance. This measure is greater as the tones required to be present are greater than MinSig, the twist is closer to 1, and the variance is closer to 0.

The signal decider 30 first examines the total power estimate by determining the signal with the greatest measure of fit and calls it the best matched signal. The signal decider 30 calculates a measure of confidence in this decision by dividing the measure of fit of the best matched signal by the sum of all the measures of fit. If only one signal matched with a non-zero measure of fit, which is often the case, the confidence calculated is 1. Otherwise, the confidence is the inverse of the number of signals that matched weighted by signal's measure of fit.

SITUATION RECOGNITION

The situation recognition portion of the call progress monitor algorithm is generally shown at 32 in FIG. 2. The situation recognition portion 32 of the algorithm is run every Epoch for each situation to be recognized. Situation recognition comprises the steps of accumulating the results of many Epochs in a "meld list" and looking at the meld list in several ways A meld list is a time-ordered list of each signal recognized and its duration. The term "meld" refers to a process of combining or melding the results of adjacent Epochs in which the same signal was recognized. Thus, if the results of 100 consecutive Epochs indicate that dial tone is present, a single entry will exist in the meld list that says that dial tone was present for 2.5 seconds (there are 25 milliseconds per Epoch).

The situation recognition portion 32 of the algorithm includes a signal meld generator 34 and a power meld generator 36 for generating a signal meld list and a power meld list, respectively. The signal meld list contains entries that represent the output of signal recognition. Each entry of the signal meld list contains the name of the best matched signal output by the signal recognition portion 26 of the algorithm, and the duration of the best matched signal. The power meld list is based on whether the estimated total power exceeds a predetermined threshold. The power meld list is used to recognize signals by their cadence, and the predetermined threshold is set to recognize a signal by its power level, even if the signal recognition portion 26 of the algorithm fails to recognize a signal by its tones.

For each Epoch, a new entry is added to each of the two meld lists and situation recognition proceeds by examining each meld list based on a situation definition. A situation definition contains entries that tell the situation recognizing portion 32 to examine the past and present history of the telephone audio data for detecting a simple signal, a complex pattern, a continuing pattern and the absence of a continuing pattern. Table A4 in the appendix lists the various situations defined in the call progress monitor algorithm according to the present invention. While only two situations are listed (labeled Situation 1 and Situation 2), it is to be understood that additional situations can be defined depending upon the particular application, without deviating from the scope and spirit of the present invention.

Referring again to the situation definitions in Table A4, a simple signal is recognized as the presence of a single signal for a given duration. An example of the recognition of a simple signal is when initiating a telephone call and looking for the presence of a dial tone for approximately 0.1 seconds, for example, before dialing the number. Another example is when a telephone number has been dialed and it is necessary to recognize the presence of a busy signal. A simple signal entry contains a meld list ID, a signal ID, a duration and a flag. The meld list ID indicates which meld list to look for the signal ID. For example, in situation 1 listed in Table A4, the first entry is a simple signal entry for recognizing dialtone. The first parameter listed for this entry is the flag which for this entry is "1", which will be explained in more detail hereinafter. The next parameter is the signal ID, which for this entry is DIALTONE. The third parameter listed is the meld list ID which is the signal meld list as indicated by the entry SIGLIST. This indicates that the signal meld list should be examined to detect his signal. The final entry is the duration of the simple signal which for this entry is 0.50 seconds.

If the most current entry in that particular meld list indicates that the signal ID has been present for at least the noted duration, then the situation recognizer 32 declares a simple signal match and terminates. The value under the column labeled flag corresponds to a value provided in a termination report. The flag typically identifies which signal was recognized.

A complex pattern is the occurrence of a sequence of signals with a particular timing. An example of the recognition of a complex pattern is when a telephone number has been dialed and it is necessary to recognize the occurrence of a special information signal. A special information signal is typically the occurrence of three simple signals in a particular order, each simple signal having a particular frequency and duration, that notifies the dialer that some network or some dialing error has occurred. A special information signal is followed by a voice announcement. The special information signal itself is actually intended for recognition by a machine.

A complex pattern entry contains a complex pattern definition ID and a flag. See for example situation 2 in Table A4 in which the sixth entry is a complex pattern. The first parameter listed for this entry is a flag having a value of −3. The next parameter listed is the complex pattern definition ID which for this entry is "WEIRD_BUSY". The situation recognizer invokes the complex pattern matcher, labeled 38 in FIG. 2, and passes it the complex pattern definition ID. If the complex pattern matcher 38 determines that the complex pattern matches the data in the meld list, examining the list from the most recently input data to the oldest input data, then the situation recognizer 32 declares a complex pattern match and terminates. The flag contains a value (−5) to provide in a termination report and identifies which complex pattern was recognized.

Table A5 lists the complex patterns which are recognized by the call progress monitor algorithm according to the present invention. Nine complex patterns are listed in table A5 although others may be added depending on the particular application of the call progress monitor algorithm. These complex patterns are stored in the DSP or computer as complex pattern definitions. The first six entries in Table A5 are complex patterns corresponding to special information tone signals. The last three entries in the table are complex patterns corresponding to various types of busy signals.

A third type of entry in a situation definition is a continuing pattern. A continuing pattern is any pattern of simple signals that can be recognized by a finite state machine. An example of the use of a continuing pattern is when a telephone number has been dialed and it is necessary to recognize the presence of the ringback signal (commonly called ringing). This signal is recognized as two seconds of ring signal, followed by four seconds of silence, with the pattern repeating, possibly forever.

In this regard, a finite state machine monitor 40 is provided in the situation recognition portion 32 of the algorithm. The finite state machine monitor 40 receives finite state machine (FSM) definitions as input and detects a continuing pattern. The finite state machine 40 has a current state which is one of a finite number of internal states. Each internal state has defined a finite number of state transitions which consists of a condition and a next state. When a condition of the current state is satisfied, the finite state machine monitor 40 goes to the next state of that particular condition. The finite state machine monitor 40 also has an initial and a preset number of terminal states.

The finite state machine monitor 40, also embodied as software, acts based on a finite state machine context block index and a finite state machine transition table ID as input. A finite state machine context block contains current state information about the finite state machine automata such as the current finite state machine state, the Epoch number that the current state was entered, the current signal and the Epoch number that the current signal was first found. Each time the finite state machine monitor 40 is invoked, the current signal information is updated from a meld list and two variables are calculated: time in a current state and the time in a current signal.

A finite state machine transition table contains the identity of the meld list for which the finite state machine is to run on and a list of entries. Each entry is in one of the following forms:

If the current finite state machine state is X and the current signal is S and the time in the current signal is greater than Y, then set the current finite state machine state to Z.

If the current finite state machine state is X and the time in the current state is greater than Y, then set the current finite state machine state to Z.

If the current finite state machine state is X, then generate an event report Y, and set the current finite state machine state to Z.

If the current finite state machine state is X, then set the FSM inhibit flag to Y and set the current finite state machine state to Z.

The finite state machine inhibit flag is a 1-bit flag provided for each finite state machine. If the inhibit flag is clear, then the situation recognizer runs the corresponding finite state machine. If an inhibit flag is set, then the situation recognizer inhibits the functioning of the corresponding finite state machine. Using this feature, a finite state machine can inhibit its own functioning or inhibit the functioning of another finite state machine.

Table A6 lists the transition tables, previously termed finite state machine definitions, which are used by the call progress monitor algorithm of the present invention. Also part of the finite state machine entry is a flag which can have a zero or non-zero value. The finite state machine monitor 40 can either return a non-terminal or a terminal status. If the finite state machine monitor 40 returns a non-terminal status, situation recognition continues. Otherwise, and if the flag has a non-zero value, it is declared that a finite state machine terminal state match is made and situation recognition terminates upon producing a termination report that contains the flag value. If the finite state machine monitor 40 returns a terminal status and the flag has a zero value, situation recognition continues since the finite state machine monitor has the ability to generate event reports independently.

Figure 12:
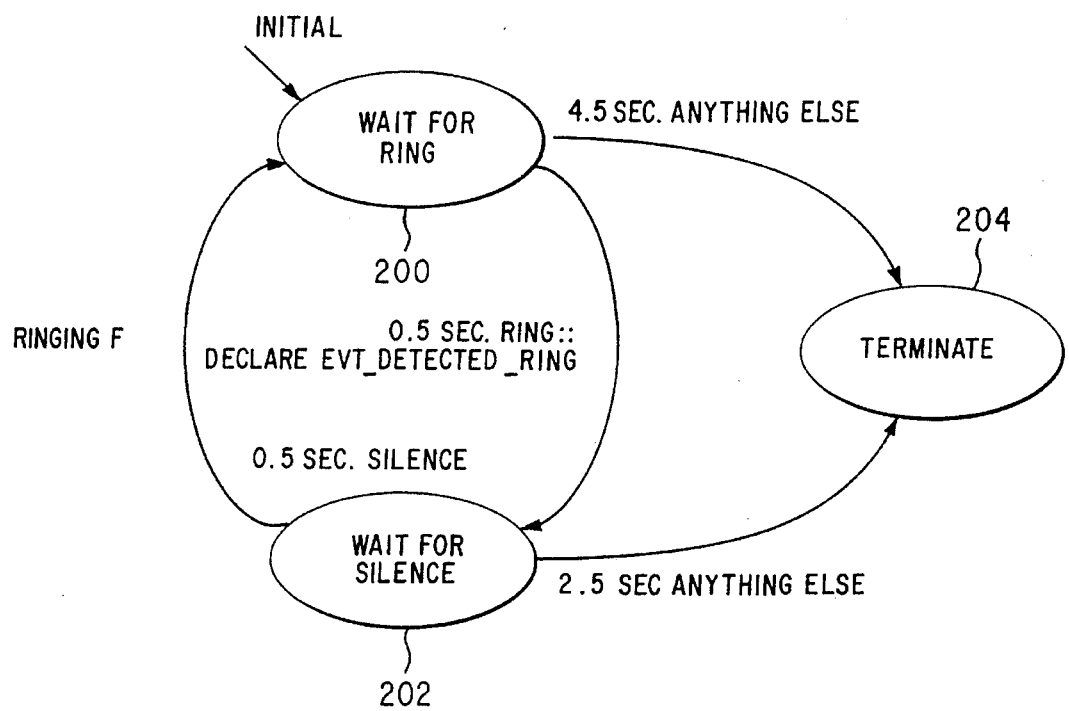
FIGS. 12 and 13 are state diagrams illustrating the operation of the finite state machines used for detecting ringing.
Figure 13:
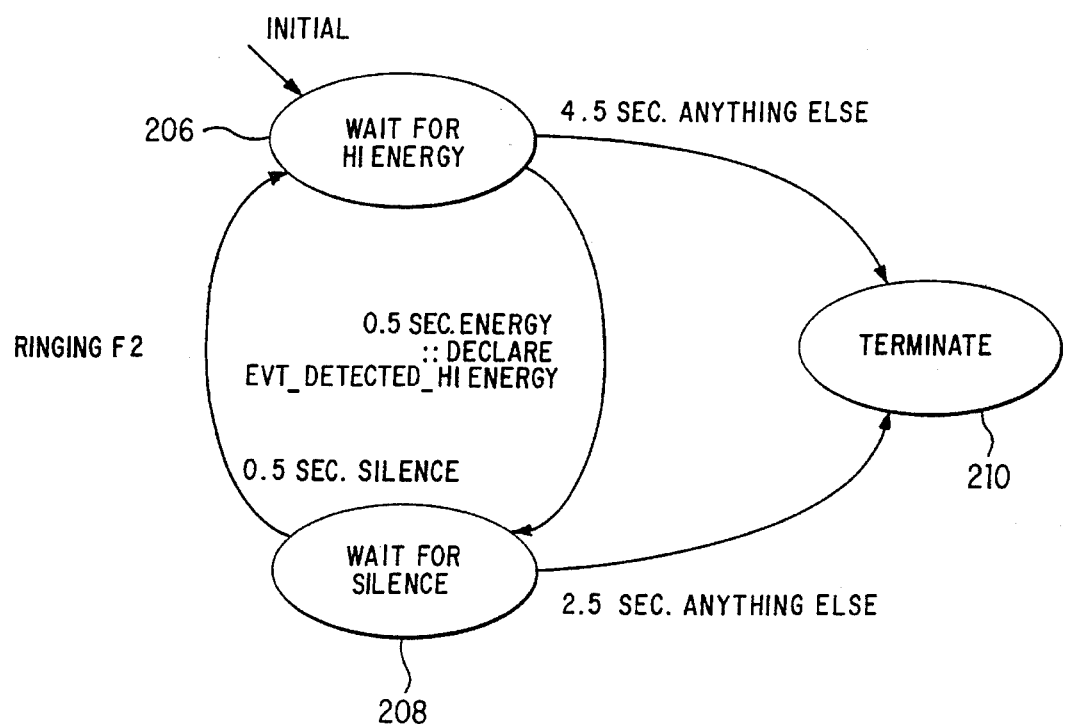
Figure 14:
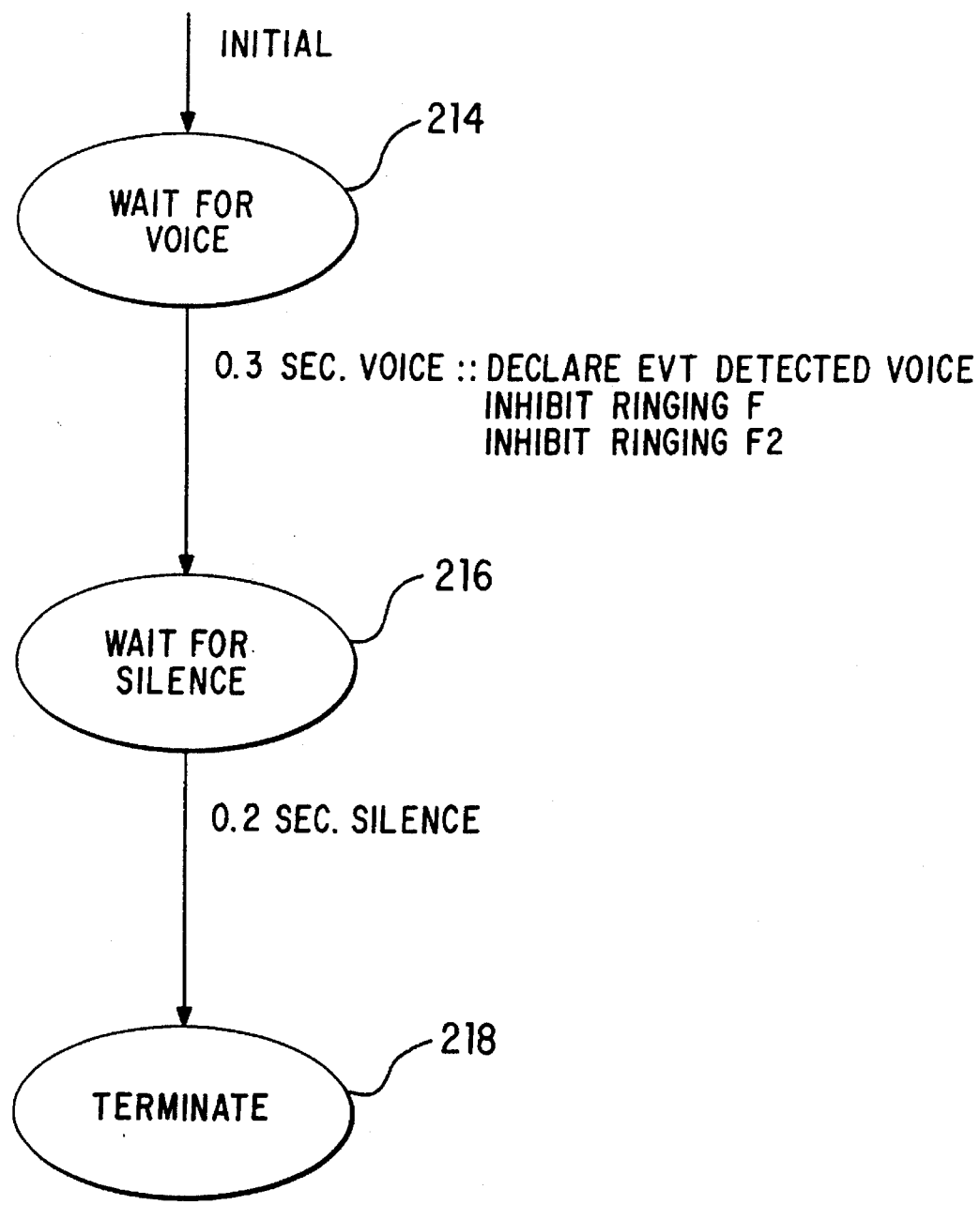
FIG. 14 is a state diagram illustrating the operation of the finite state machine used for detecting pickup.

The Transition Tables listed in Table A6 are symbolic representations of the state diagrams shown in FIGS. 12–14 and correspond to finite state machines which perform the state transitions shown by this state diagrams. In these diagrams, states are represented by ellipses, and state transitions by arrows. State transitions are labelled by the condition that causes them, followed optionally by any transition action to be taken. The initial state is labelled by an arrow marked "Initial". The terminal state is so marked.

For the first state diagram in FIG. 12, labelled RingingF, the initial state 200 is "Wait for Ring". In this state, if 0.5 seconds of contiguous ring is detected (i.e 50 consecutive Epochs with ring detected to be the best matched signal), the FSM declares the event "EVT-DETECTED RING" and transitions to state 202 labelled "Wait for Silence". On the other hand, if after 4.5 seconds a 0.5 second ring has not been detected, the FSM transitions to the terminal state 204, labelled "Terminate". At this point the FSM is stopped. Similarly, if the FSM is in state 202, then if 0.5 seconds of contiguous silence is detected, the FSM transitions to state 200. The FSM then cycles between states 200 and 202, as long as ringing is present and detected. Otherwise, if after 2.5 seconds a 0.5 second silence is not detected, the FSM transitions to the terminal state 204.

The FSM defined by this state diagram is non-terminal (i.e is "running") if ringing is present and detected, and is terminal if ringing is not present. Hence, the finite state machine defined by the state diagram shown in FIG. 12 detects ring failure. This state diagram defines ringing rather "loosely". In other words, there are many cadences that the FSM will accept as ringing. The range of cadences that this FSM accepts is roughly from 0.5 second on, 0.5 seconds off to 2.5 seconds on, 4.5 seconds off. This is intentional, as different sources of ringing (especially PBX's) generate cadences quite different from the standard 2 seconds on, 4 seconds off. The definition given covers all ringing signals in standard use, with some tolerance allowed for misdetection.

The state diagram shown in FIG. 13, labelled RingingF2, accepts basically the same ringing signal as that accepted by the first diagram, with the exception that this state diagram uses the presence of "HiEnergy" (of no Particular frequency) in the Proper cadence to recognize ringing. The purpose of providing a finite state machine implementing this state diagram is to detect ringing in certain telephone systems that do not generate the standard 440 Hz plus 480 Hz ring signal. To allow the host to distinguish this, this diagram declares "EVT-DETECTED HIENERGY" on the transition from "Wait for HiEnergy" in state 206 to "Wait for Silence" in state 208, rather than EVT DETECTED-RING. Like the state diagram of FIG. 12, this state diagram also includes a terminal state 210.

The state diagram shown in FIG. 14, labelled Pickup, is used to detect when a telephone is picked-up by an answering party. The initial state 216 is "Wait for Voice". In this state, if 0.3 seconds of contiguous voice energy is detected, the FSM embodied by this state diagram declares "EVT DETECTED VOICE", and transitions to state 216 labelled "Wait for Silence". In this state, the FSM waits for 0.2 seconds of silence, and then transitions to the terminal state (marked "Terminate"). This state diagram describes an FSM that terminates at the first pause after someone picks up the telephone and speaks. Since there are no timeouts defined, this FSM could conceivably run forever. The higher level situation definition precludes this by defining a 30 second timeout. In addition, though not shown in Table A6, the transition from state 214 to 216 is accompanied by setting the inhibit flags of the RingingF and RingingF2 FSM's to inhibit further operation of these FSM's.

Figure 15:
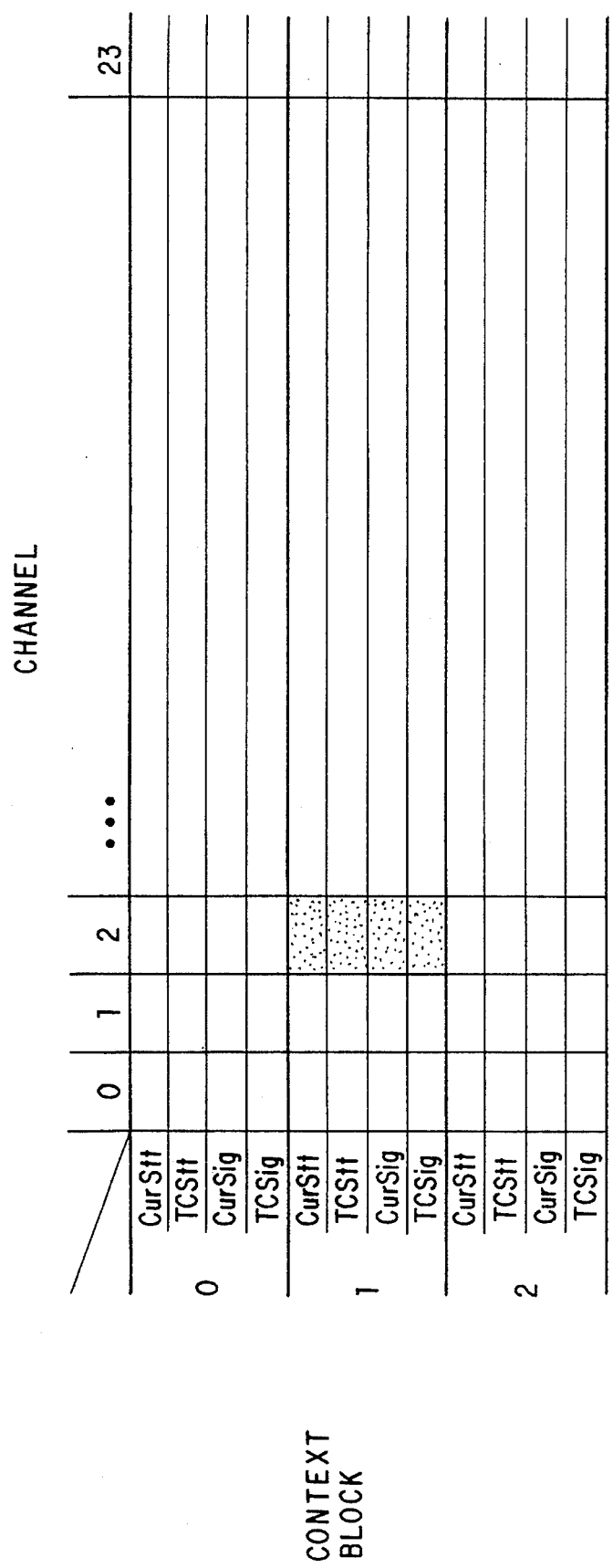
FIG. 15 is a diagram illustrating the context block indexing scheme for referencing the finite state machines running on data in each of 24 channels of information.

Situation 2, as defined in Table A4, runs these three state machines simultaneously. In the worst case, it may happen that all 24 channels are commanded to run situation 2. In this case, 3 FSM's are needed to run for each channel. Separate contexts must be kept for each of the 72 FSM's running (3 FSM's/channel×24 channels). FIG. 15 illustrates this situation. A separate context block is provided for each channel (0–23), for each possible FSM (0–2) that can be running. For example, in the context block for Channel 2, FSM 1 is darkened in the Figure. Each context block contains the variables necessary to operate the FSM. These are labelled CurStt (Current State), TCStt (Time in Current State), CurSig (Current Signal), and TCSig (Time in Current Signal). Given these variables, and a transition table such as one of those shown in Table A6, a finite state machine can be implemented that behaves as described above, by means well known in the art.

Referring again to the definition of Situation 2 in Table A4, the lines that invoke an FSM start with the mnemonic SE_K_MONITOR. The next number or symbol on each such line is a flag. The first instance an entry in this table invokes an FSM is for the Pickup FSM, for which the flag has the value of 1. This indicates that when the Pickup FSM terminates, the situation should terminate and report a value of 1 in the termination report. The last number on this line is a 0. This indicates that when this FSM is running, the Context Block 0 should be used, as shown on FIG. 13. The next instance of an entry invoking an FSM is for the RingingF FSM, for which the flag has the value represented by the symbol –FSMGBASE. This value is special, in that it represents the start of a set of flag values that are reserved for finite state machine groups. A finite state machine group is a collection of finite state machines that are treated in a special manner. Any finite state machine invoked in a situation definition with a flag value equal to or less than FSMGBASE is a member of a finite state machine group. All members of the same group have the same flag value.

Another type of entry in a situation definition is a finite state machine group entry. This type of entry includes a number of entries identified to be contained in a particular finite state machine group. A finite state machine group is a set of finite state machines that are related in the following fashion.

A finite state machine group is non-terminal if any of its member finite state machines are non-terminal. Conversely, a finite state machine group is terminal if all of its members are terminal. Situation recognition runs all non-terminal finite state machines in a group and then determines if the group is terminal. If the group is determined to be terminal, then if the flag value is non-zero, situation recognition declares that a finite state machine group terminal match has been made and produces a termination report that contains the flag value. On the other hand if the flag value is zero, situation recognition continues.

A finite state machine group is used to recognize the failure of ringing where ringing is defined to be either the presence of a genuine ringing signal as determined from the signal meld list or the presence of a noisy ringing signal such as a repeating pattern of high energy for 2 seconds and silence for 4 seconds as determined from the power meld list.

Referring again to FIGS. 10 and 11, the two FSM's RingingF and RingingF2 are members of a finite state machine group, as indicated by the fact that they both have the same flag value, and by the fact that the flag value is equal to minus FSMGBASE. Consequently, ringing is determined to be present if either one or both of these FSM's are running, and ringing is determined to be absent if both of these FSM's are not running. Finally, the context block index value (the last value on the line in the definition of Situation 2 in Table A4 for these two FSM monitors) is 1 and 2, respectively. Because the index value for the first FSM (Pickup) is 0, each FSM uses a different context block so that the algorithm can correctly run each FSM.

A final entry in a situation definition is a timeout entry which contains a duration and a flag. A timeout occurs if no other entry matches within the duration value of time from when situation recognition commenced. For example, in Situation 1 of Table A4, a "Timeout" is declared when nothing else is detected after 6.0 seconds. Situation recognition then declares a timeout and terminates with a termination report containing the flag value –19.

As mention above, several of the entries in a situation definition include a flag. The value of the flag is included in the Situation Termination Report for communicating to the host whether or not a particular situation definition entry or condition has been detected. The assignment of the value of the flag to a particular condition or situation definition entry is totally arbitrary. A table of values and their meaning is stored in a memory of the host machine. When a Recognize Command Termination Report is returned to the host, the value of the flag is an indication to the host that a particular condition was detected or failed to occur. During implementation of the call progress monitor algorithm, the value of the flag may be zero. A value of zero indicates that to termination report is generated and monitoring continues.

Table A7 in the appendix lists the meanings of the flags used in Situations 1 and 2 of table A4. For example, if the host commands the call progress monitor algorithm to run Situation 1 and receives in a termination report the flag value 1, this indicates to the host that Dialtone was detected. Similarly, if the host commands the call progress monitor to run Situation 2 and receives in a termination report the flag value 1, this indicates to the host that pickup was detected.

Referring back to FIG. 2, the key component of the situation recognition portion 32 of the algorithm is the situation recognizer 42. The controlling input to the situation recognizer 42 is a situation definition. The situation recognizer relies on a particular situation definition to tell it what to recognize and what to do if something is recognized or if it is not recognized. A situation definition covers all possible conditions that may occur in a given situation and indicates when to terminate the recognition and return a recognition status or cause the situation recognizer 42 to announce an event and continue to recognize. The situation recognizer 42 invokes both the complex pattern matcher 38 and the finite state machine monitor 40.

Figure 6:
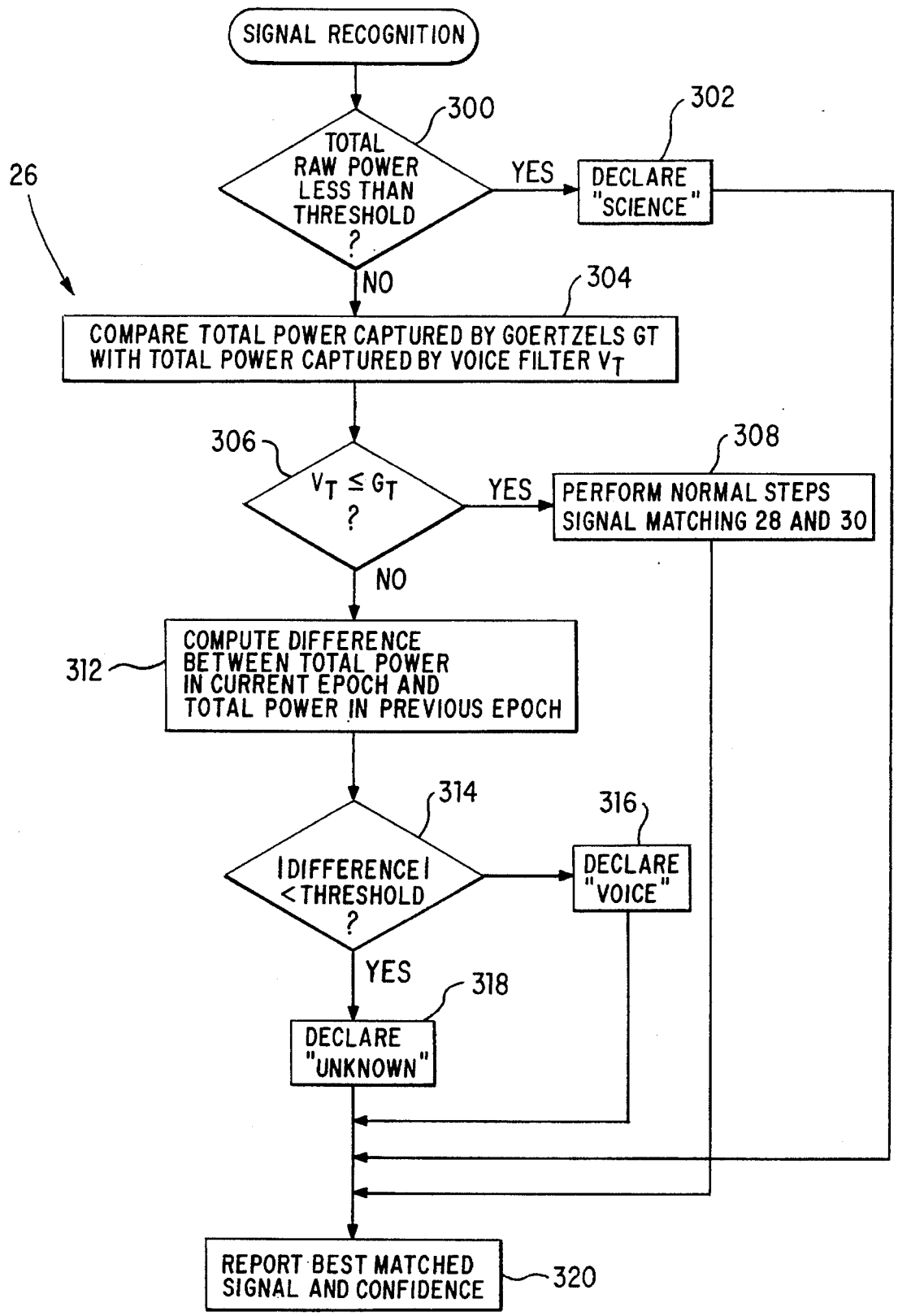
FIG. 6 is a flow diagram illustrating the modified signal recognition stage of the algorithm, in accordance with the present invention.

As mentioned above, the complex pattern matcher 38 is invoked by the situation recognizer 42 to compare a complex pattern to the most recent data in a meld list. Referring now to FIG. 6 and the second entry in Table A5, an example will be described of the complex matching procedure for comparing an input with the complex pattern for the special information signal "customer irregularity".

Similar to the complex pattern matcher 38, the finite state machine monitor 40 is invoked by the situation recognizer 42 to recognize a continuing pattern. As an example, the transition table that monitors ringing and terminates on ringing failure is listed as the first table in the Table A6 and labeled "TT_RingingF". This transition table forces a match if RINGING is not occurring. The occurrence of the match indicates a failure, that is, no ringing is detected. If RINGING is occurring, this transition table monitors it forever. The failure status is determined by the higher level situation table entry T_SE_MONITOR, described hereinafter. This transition table indicates a terminal state.

The initial state of the transition table "TT_RingingF" is state 1 and the terminal state is state 0. If the current state is 1 and the current signal detected is ringtone for a period of time greater than 0.5 seconds, the transition table requires that state 2 be the next current state. If the current state is 1 and the time in the current state is greater than 4.5 seconds, on the other hand, then the next current state is state 0 (the terminal state—no ring is detected). If the current state is 2 then an event report is generated termed "ring detected" and the next current state is state 3. If the current state is state 3 and the current signal is silence for a period of time greater than 0.5 seconds, then the next current state is state 1. On the other hand, if the current state is state 3 and the time in the current state is greater than 2.5 seconds, then the next current state is state 0 (the terminal state—a constant ring).

The second table in Table A6, labeled "TT_RingingF2" is essentially identical to the first, but looks at the power meld list rather than the signal meld list, so as to detect the presence of ringing solely by cadence rather than by both cadence and tone. This is required for robust algorithm performance with older telephone systems.

The third table in Table A6, labeled "TT_Pickup" detects the occurrence of a telephone pickup and a human utterance. It does this by matching the following pattern: at least 0.3 seconds of continuous voice, followed by anything for any period of time as long as it is not silence, followed by 0.2 seconds of silence. When at least 0.3 seconds of continuous voice is detected, a voice detected event is generated. This allows the host to measure the time from the onset of voice to the 0.2 seconds of pause, when the finite state machine monitor terminates (and generates a Recognize Situation Termination Report). When the host receives the termination report, it can use this time measurement to crudely indicate what sort of party answered the telephone, and can begin conveying speech to the party dialed by the host.

From these three transition tables, it is appreciated that the call progress monitor detects ringing signals as long as they exist (up to 30 seconds) and does nothing. However, when ringing is not detected or no longer detected, a check is made for 0.3 seconds of voice followed by 0.2 seconds of silence indicating that the line has been picked up.

Situation 1 listed in Table A4 is designed to obtain a telephone line and detected a dialtone on it prior to placing a call. Each condition or entry in the situation definition is tested or run every Epoch. Specifically, all of the entries with a label SIGNAL are run, and TIMEOUT, every Epoch. When the entry labelled END is reached, situation recognition starts again at the next Epoch from the first entry in the table. This particular situation succeeds upon detecting 0.5 seconds of dialtone on the line. In actuality, this translates into detecting dialtone for 20 consecutive Epochs. Upon detecting this condition, the algorithm terminates and reports a flag value of 1 indicating a success in detecting dialtone. If any other flag value is reported, this is an indication that dialtone was not detected.

Specifically, it is possible when accessing a telephone line that another person is on the line, and voice would then be detected by the algorithm and the flag value −8 is reported. It is also possible that another person (or machine) has just accessed the telephone line to place a call and a ringing signal may be present. This would be indicated with a flag value of −1 in a termination report. So long as a flag value other than 1 is reported, the host is told that no dialtone is present on the line and it may be desirable to try again later or diagnose a problem with the telephone line. In this regard, the host may include diagnosing software that can directed the machine to address the condition of a signal other than dialtone being detected on the telephone line. Diagnosing procedures will be described in detail hereinafter.

Situation 2 listed in Table A4, is used for monitoring call progress after a telephone number has been dialed and is slightly more complex because it is more likely that other types of signals may be present on the line after dialing a telephone number. This situation allows the telephone to ring for up to 30 seconds. Ringing is monitored either by the presence of a normal ring signal of the proper cadence or by the presence of noise in the proper cadence. An intermediate event report termed "RING_DETECTED" is generated whenever a ring is detected. Then, the algorithm monitors for a pickup of the telephone line, 0.3 seconds of steady voice, and 0.2 seconds of silence. Once 0.3 seconds of voice is detected, an intermediate event report termed "VOICE_

DETECTED" is made. After the 0.2 seconds of silence, the situation terminates with a success by returning a flag value of 1. Otherwise, a failure is declared when neither normal nor noisy ringing is detected, 0.1 seconds of dialtone is detected, 0.1 seconds of busytone or weird busy is detected, or when any special information signal or special information tone pattern is detected. Furthermore, when the special information signal is detected, the type of special information signal is reported so that further diagnosing can be made by the host. Finally, a "Timeout" is declared if nothing is detected after 30 seconds.

When the situation recognizer 42 is commanded to recognize Situation 2, each of the procedures listed in Table A4 (under Situation 2) are performed. Specifically, when commanded to recognize Situation 2, the situation recognizer 42 invokes the complex pattern matcher 38 to look for matching of the following complex patterns:

STP_IC
STP_NC-B
STP_NC-I
STP_RO-B
STP_RO-I
STP_VC, which are listed in Table A5. In addition, the situation recognizer 42 invokes the finite state machine monitor 40 to monitor the following state transitions:

TT_PICKUP
TT_RINGINGF
TT_RINGINGF2, which are listed in Table A6. The value of the flag or termination report is listed beside each of the entries for Situation 2. As shown in the entries for Situation 2, the value of the flag corresponds to a particular type of event detected. For example, when the complex pattern matcher finds a match for the any of the special information tone patterns listed, which indicates the detection of a special information tone or signal, the situation terminates and reports a flag or report number, such as, for example, −5 indicating that the special information signal VC was detected. Similarly, if the finite state machine monitor 40 finds a match for the table labelled BUSY DETECTED, the situation is terminated and reported with a flag −3, indicating that the normal busy signal was detected.

Situation 2 uses all three of the transition tables listed in Table A6 to detect a phone pickup. This can be seen as follows. A telephone call is successfully proceeding if the telephone is ringing. If the telephone rings for too long a period of time, then one can assume that no one will answer. Situation 2 generates a Termination Report after 30 seconds of ringing with no pickup. As can be seen in the second table in Table A4, Situation 2 reports a timeout with a flag value of −19 to indicate this condition. On the other hand, if no ringing is heart, then something is wrong with the call. Situation 2 uses transition tables TT_RingingF and TT_RingingF2 in a "finite state machine group" (further explained hereinbefore) to detect the absence of ringing. These transition tables will cause the absence of ringing to be reported about 5 seconds after the normal telephone ringing pattern is not heard. (At least 4 seconds is needed to determine that nor ring is going to happen.) Such a condition is reported by a flag with a value −FSMGBASE. (FSMGBASE is a symbol defined to have the value 20.) If any other signal is detected, such as dialtone, busy, or one of the Special Information signals, then something is wrong with the call. If this happens, Situation 2 generates a Termination Report that uniquely identifies the failure to detect ringing.

For example, if the telephone is busy, Situation 2 will generate a Termination Report with a flag value −2 (or −3 if weird busy is detected but normal busy is not detected). Finally, if someone picks up the telephone, Situation 2 uses transition table TT_Pickup to detect a human's voice, and to identify when they pause, so that the host can, for example, initiate the generation of voice prompting at the proper time.

Because only one type of call progress signal can exist on a telephone line (or a single channel) during any particular interval of time (such as an Epoch), by examining all the possibilities defined in a particular situation using the complex pattern matcher 38 and the finite state machine monitor 40, the call progress monitor 10 can precisely follow the progress of a telephone call.

Situation definitions can also select different Goertzels filters, some of which are unique to a particular situation while others are common to each situation definition. A situation definition may also change, by definition, the duration of an Epoch. For example, DTMF signals, according to Bellcore specifications, are as short as 40 ms in duration. Employing Epochs which are 25 ms in duration creates the possibility that a 40 ms burst would be partially seen by two Epochs but not correctly identified. This is because Epochs that "see" the beginning and ending of tones are unlikely to correctly identify the tone. Therefore, more Epochs per DTMF tone are needed. An Epoch comprising 50 samples having a total duration of 12.5 ms is appropriate so that a DTMF signal would span at least 3 Epochs. Further yet, a situation may invoke a detection algorithm which is dedicated to detecting particular types of signals, such as DTMF signals.

OPERATION OF THE CALL PROGRESS MONITOR

When monitoring the progress of a telephone call, the algorithm is commanded to recognize certain situations according to predefined situation definitions. Once a particular definition is recognized, not recognized, or an intermediate report is made, the algorithm is commanded to continue recognizing that particular situation or to recognize another situation. The sequence of situations which the call progress monitor algorithm is commanded to recognize depends on the particular application of the algorithm. The parameters of the situation definitions, signal definitions, complex pattern definitions, finite state machine definitions, and the particular frequencies of tones of interest may vary. For example, the number and type of special information signals can be expanded as more of these type of signals are used by the telephone companies. It is necessary only to sample these new signals for defining at what frequencies the special information tones exist.

Figure 9:
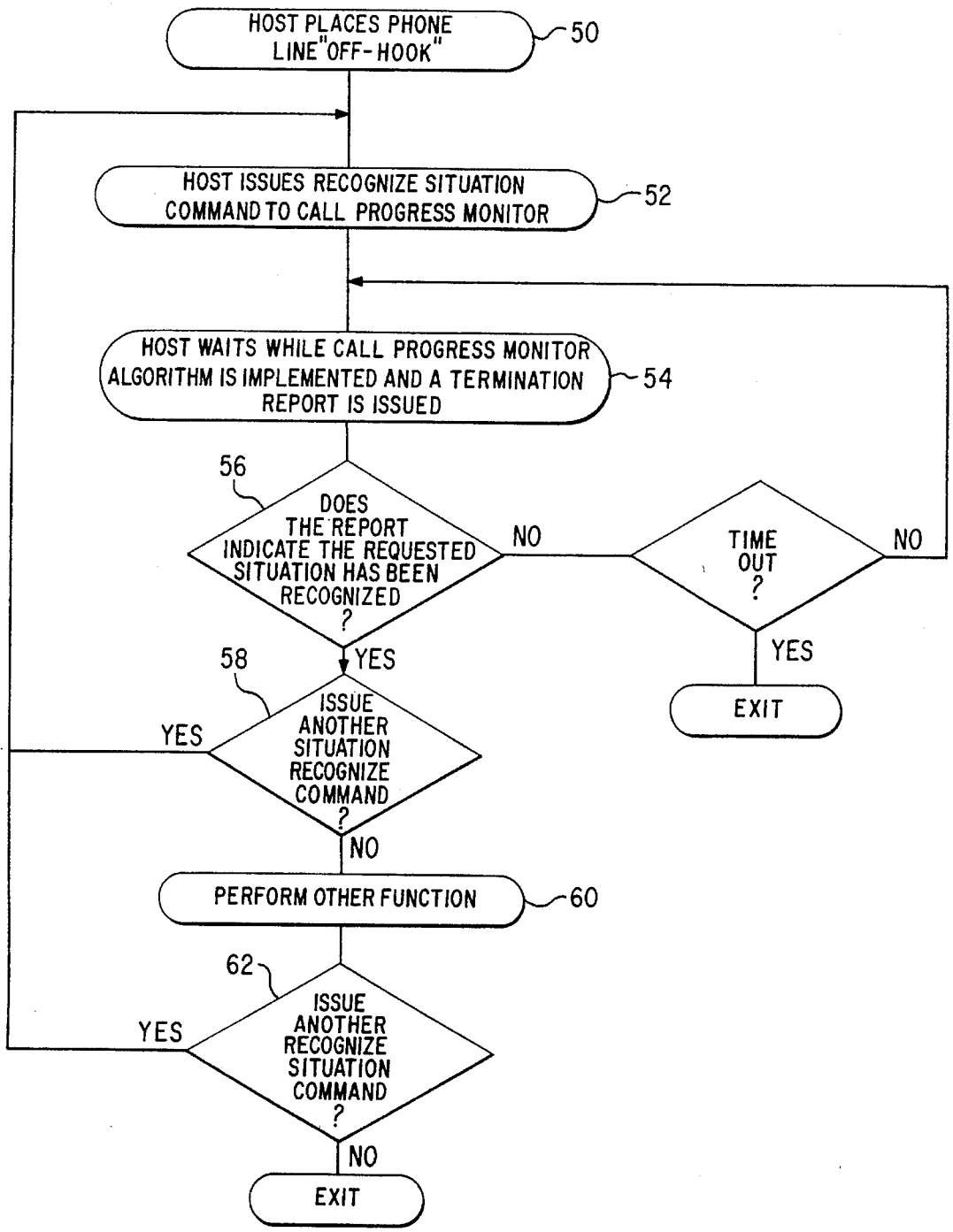
FIG. 9 is a flow diagram illustrating the general operation of the call progress monitor together with a host controlling machine.

An example of the use of the call progress monitor algorithm by a host computer that is placing a telephone call follows with reference to FIGS. 1 and 9. A software algorithm in the host 11 first places the telephone "off-hook" in step 50 and then commands the call progress monitor 10 to recognize a particular situation in step 52, such as, for example, dialtone by issuing the corresponding Recognize Situation Command specifying Situation 1, listed in Table A4.

The host 11 then waits for the call progress monitor 10 to generate a Recognize Command Termination Report during step 54. This report may, for example, identify either that (0.5 seconds of) dialtone was detected, or that some other outcome, such as that the call progress monitor 10 waited 6 seconds without detecting anything on the line. Such would be the case, for example, if the telephone line were actually "dead". Upon receiving the Recognize Command Termination Report, in step 56 the host examines the report to determined if it indicates that the desired situation, such as dialtone, for example, was detected. If the desired situation was not detected, and a preset time out has not been exceeded in step 55, step 54 is repeated. Otherwise, depending on the Recognize Command Termination Report, the host can decide whether to issue another Recognize Situation Command or to perform some other function in step 58.

If another Recognize Situation Command is to be issued, the host issues a new command as indicated by the return to step 52 in the diagram of FIG. 9. On the other hand, the host may decide in step 58 to perform some other function in step 60, such as dialing a desired telephone number, typically by placing Dual Tone Multiple Frequency (DTMF) signals on the telephone line 13. Furthermore, depending on the type of function performed in step 60, the host may issue another Recognize Situation Command as illustrated by step 62. In the instant example, the host 11 commands the call progress monitor to recognize the outcome of the telephone call by issuing a Recognize Situation Command specifying Situation 2, also listed in Table A4. This situation monitors that the line is ringing, is picked up and answered by a voice, or is signalling busy or one of a number of special information tones as part of a special information signal.

Figure 10:
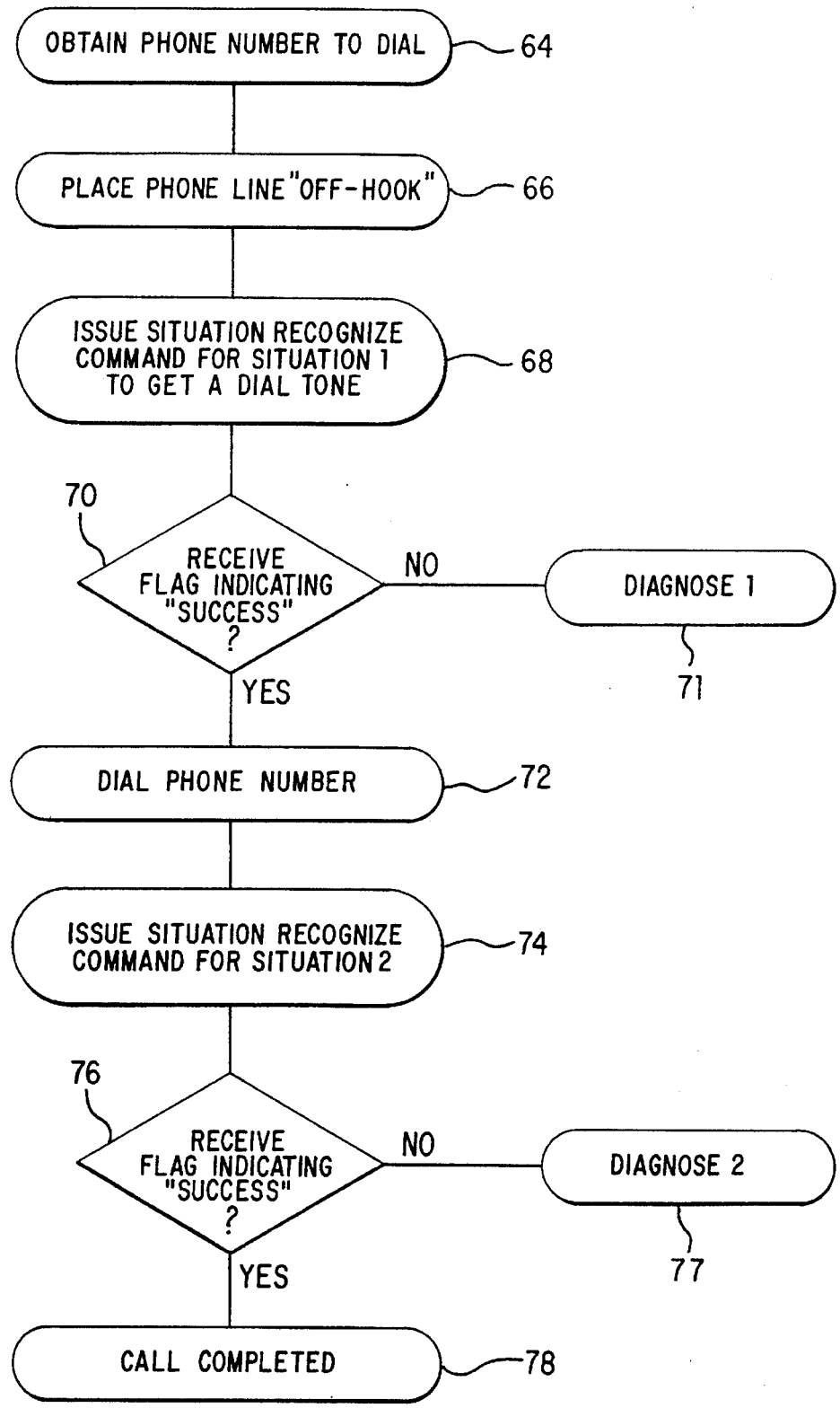
FIG. 10 is a flow diagram illustrating the general operation of the host controlling machine in response to reports received from the call progress monitor.

FIG. 10 illustrates a flow diagram corresponding to a software program used in the host machine to place a telephone call and interact with the call progress monitor of the present invention. The host first obtains the telephone number to be called in step 64, then places the line "off-hook" in step 66. The host then issues a Recognize Situation Command in step 68 to the call progress monitor specifying the command for recognizing Situation 1 to detect a dialtone on the line. Eventually, a flag will be returned from the call progress monitor to the host. In step 70 the host determines whether this flag indicates a success in finding a dialtone or some other condition. If a flag value indicating some condition other than dialtone was detected, the host enters a Diagnose-1 routine 71 described hereinafter. Otherwise, if a flag value indicating that dialtone was detected, the procedure continues to step 72 in which the host dials the telephone number, by means well known in the art.

After the telephone number is dialed, the host issues another Recognize Situation Command in step 74 specifying Situation 2. As before, the host waits to receive a flag from the call progress monitor. In step 76, the value of the flag is examined. If the value of the flag indicates that a condition other than pickup has occurred, the procedure diverts to a Diagnose-2 routine 77 described hereinafter. Otherwise, the flag value indicates that a successful pickup occurred and the call is completed as indicated in step 78.

Figure 11A:
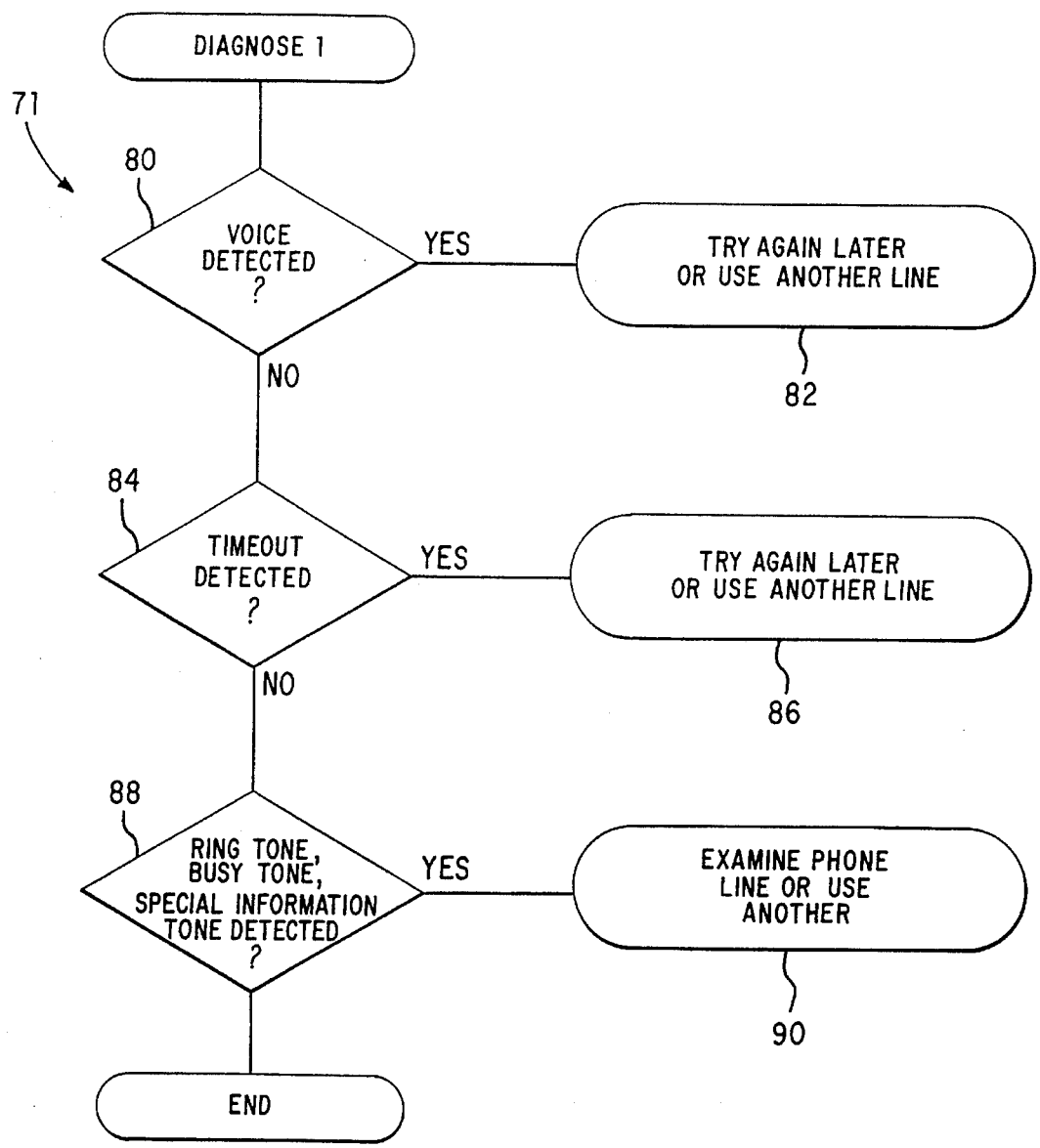
FIGS. 11A and 11B are flow diagrams illustrating diagnosing routines of the host controlling machine used for determining and dealing with particular call progress signals detected by the call progress monitor.
Figure 11B:
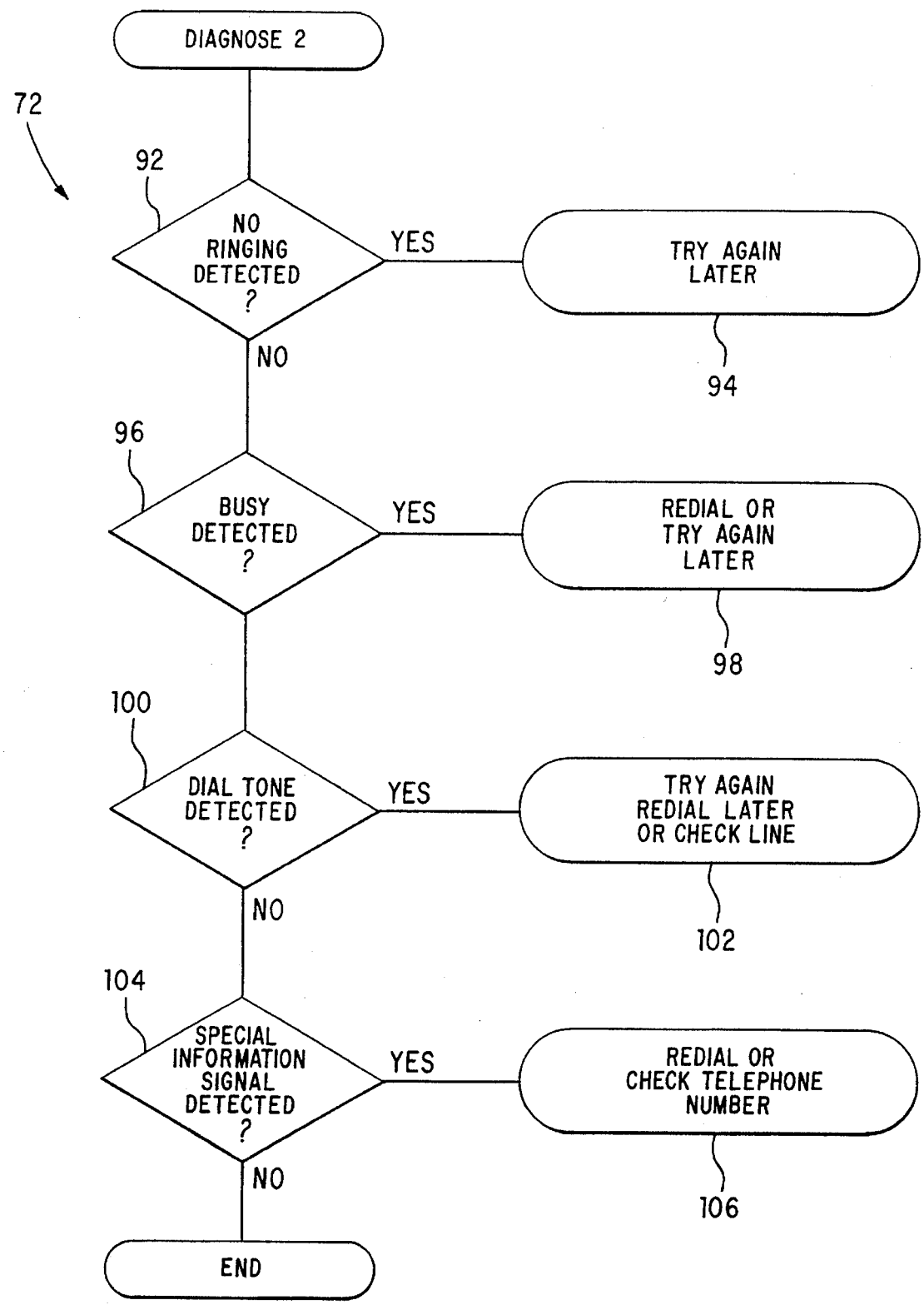

FIGS. 11A and 11B illustrate the Diagnose-1 and Diagnose-2 routines in detail. Diagnose-1 is used when the call progress monitor returns a flag indicating that a condition other than dialtone was detected. Specifically, a determination is made in step 80 for the presence of voice on the line. If voice is detected on the line, the host will try the line again later or access another line to place the call as shown in step 82. Next, a determination is made in step 84 for a flag value indicating a Timeout occurred when running Situation 1. If Timeout occurred, the host will try again later or use another line as evidenced in step 86. Finally, a determination is made in step 88 for the presence of a ringtone, busytone, or a special information tone. Also, the identity of one of these signals is made in step 88. Depending on which of these signals existed, the host will use another line and/or alert a user to check a particular telephone line as shown in step 90.

The Diagnose-2 routine shown in FIG. 11B is used when a condition other than pickup is detected when running Situation 2. In step 92, it is determined whether no ringing signal was detected. If this is true, then the host will try again on the same or another line later in step 94. In step 96, it is determined whether a busy signal (regular or weird) is detected and identifies which of these busy signals is detected. Depending on the type of busy signal detected, the host may try again later in step 98 or redial the number. In step 100, the presence of dialtone is determined, and if so, the host will redial, try again later, or check the line in step 102. Finally, in step 104, the presence and identity of a special information signal is determined. Then, depending on which type of information signal is present, the host will redial the number or check the validity of the number in step 106.

It is to be understood that the structure and complexity of the diagnosing routines may vary depending on the particular application. Also, these routines may be embodied by very simple algorithms described or by faster and more sophisticated decision making software, well known in the art.

The call progress monitor algorithm of the present invention can be used in several environments. It is envisioned that the algorithm has utility in voice mail systems or other telephone interactive systems which make outgoing telephone calls.

Particularly, the present invention has utility in the anonymous interactive telephone systems disclosed in U.S. Pat. Nos. 4,847,890 and 4,878,239. In these systems, it is necessary, under certain conditions, to anonymously connect a caller to a subscriber without the caller knowing the identity (and telephone number) of the subscriber. Consequently, while maintaining connection with the caller, the system dials the subscriber based on a telephone number stored in a memory of the system. The call progress monitor of the present invention is used to monitor the progress of the outgoing telephone call to the subscriber. Upon the call being completed and picked up by the subscriber under the control of the call progress monitor, the anonymous interactive telephone system then permits the caller to speak with the subscriber. In this application, the host is embodied as the anonymous interactive telephone system.

Yet another application of the call progress monitor algorithm according to the present invention is in large telephone switching networks. Specifically, certain switching units are placed on the back of large telephone switching stations for providing special services. Such switches are know in the art as "boutique" switches, such as, for example, a switch sold under the name of Summa SDS 1000, by Summa Four, Inc. Typically, the boutique switch has a space for building other switching structures like those associated, with special services, such as the interactive telephone systems described above. The call progress monitor of the present invention may be attached to the boutique switch for interfacing with a special services device (hereinbefore referred to as host).

Furthermore, the algorithm can be modified to detect certain tones generated by telecopier machines, modems and message recording machines for communicating with other machines and people. In this regard, Situation 2 may be expanded to include the detection of facsimile machines tones and modem signals. Situation 2 can also be expanded to detect tones typical of voice recording message answering machines so that appropriate action can be taken by the host.

Further yet, the call progress monitor algorithm of the present invention can be modified to detect other types of telephone signals, such as Dual Tone Multiple Frequency (DTMF) and Multiple Frequency (MF) signals which are audible signals. DTMF tones are the standard "touch-tones" produced by a touch-tone telephone. MF tones are used by the Central Office of the telephone company for Central Office Signalling. New filters and situation definitions can be used, or the described situation definitions can be expanded, to incorporate detection of more sophisticated signaling using DTMF and MF signals.

Figure 16:
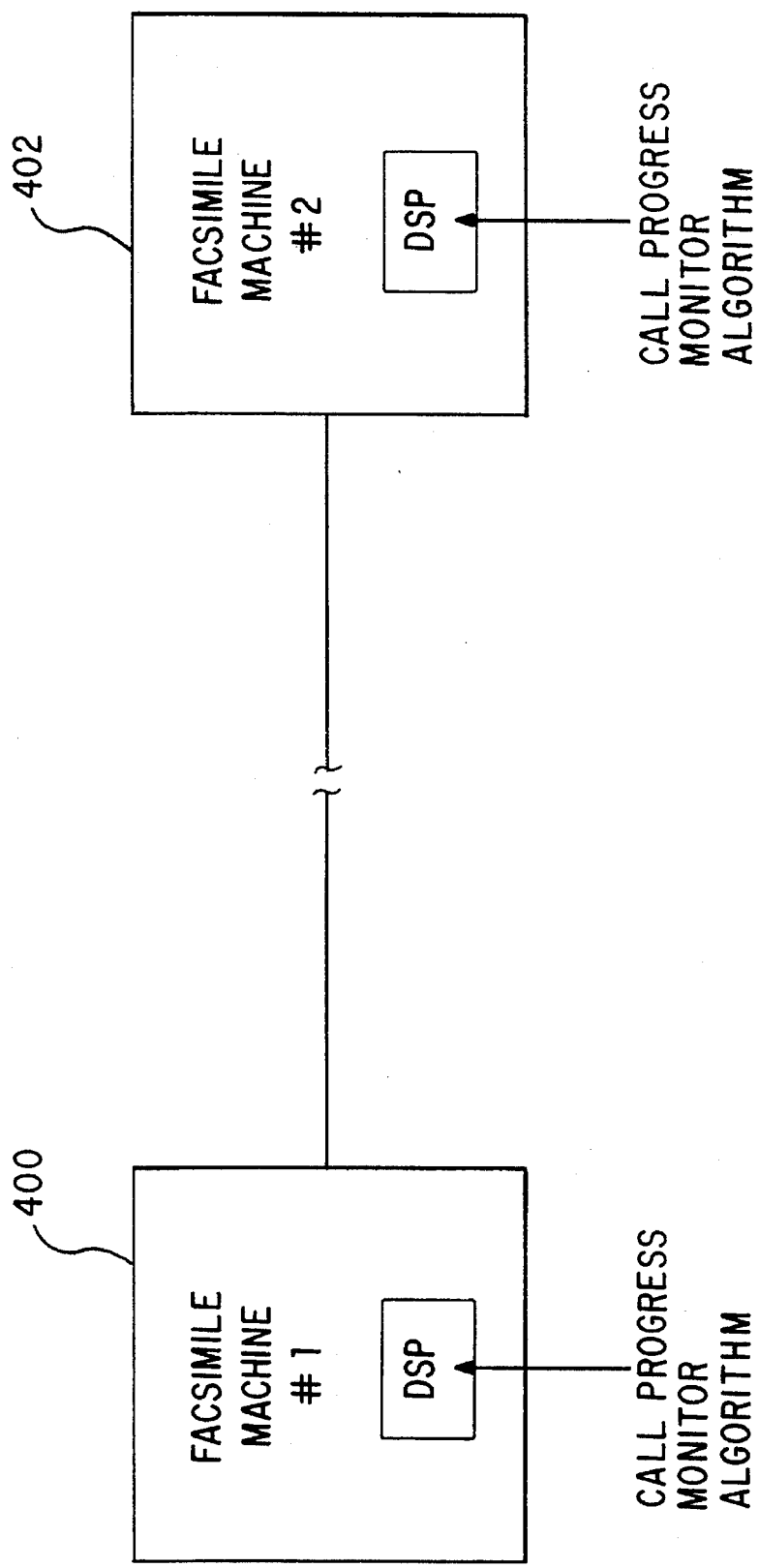
FIG. 16 is a block diagram illustrating a further use of the call progress monitor in accordance with the present invention.

Additionally, the algorithm according to the present invention can operate on any source of audio signals for which it is desired to discriminate between certain ones of audio signals supplied by the source. For example, as shown in FIG. 16, the call progress monitor algorithm can be run on a digital signal processor (DSP) either or both of two facsimile machines 400 and 402.

Prior to the facsimile machines 400 and 402 changing fax tones, one of the machines must dial a phone number. Without the ability to discriminate between certain call progress signals the dialing facsimile machine is "blind" to what is happening. As an example, the dialing facsimile machine may reach a busy number or a wrong number which is answered by a person announcing "Hello". Most facsimile machines currently available wait for the dialed facsimile machine to send a tone acknowledging it is a facsimile machine. If no tone is heard within a certain amount of time, the sending facsimile machine must hang up and redial until it gets through. Consequently, the sending facsimile never knows why the call did not go through; only that it did not. Moreover, facsimile machines of different manufacturers have a difficulty in establishing the coordination because many tones sent by one machine are not recognized by the other machine.

A facsimile machine which runs the call progress monitor algorithm on its DSP will be much smarter than those without. If a facsimile dials a number and reaches a busy signal, the machine will know immediately that the line is busy. The output of the call progress monitor algorithm may be used to trigger a program in the memory of the DSP to access another facsimile on a different line but at the same business establishment as the first attempt (many businesses having many facsimile machines associated with dedicated telephone numbers). If the dialed number is wrong and the call reaches a SIT tone, instead of redialing repeatedly, the facsimile machine would know that would be of no use and may instead display to the operator that a wrong number was entered.

Another option is to program the facsimile machine to announce (through voice synthesis): "This is a fax machine calling 555-1212. If this is the correct number, please connect me to your fax machine." In this manner, small businesses would not need separate phone lines for fax machines.

The procedures illustrates in FIGS. 9–11B may be used, with some minor adaptations where appropriate, to perform the above-described procedure.

Some more sophisticated facsimile machines may be programmed to send out faxes late at night when rates are lower. By using the call progress monitor algorithm in a sending facsimile machine, the machine could determine if the number dialed is busy, so that it may continue to send other faxes and return to the busy number later. Again, the machine would also know if the dialed number results in reaching a SIT tone so as not to repeat dialing. The result is that a facsimile machine may determine the state of the call quickly and, therefore, get more faxes through in the same amount of time. Faxes that do not get sent may be marked as to why they did not go through.

The call progress monitor algorithm may be implemented by the DSP in each facsimile machine to provide a more accurate mechanism of carrying out the progress of outgoing phone calls. Moreover, no additional hardware need to be provided since the algorithm can be run by the DSP already in the facsimile machine. The code for the algorithm need only be stored in a memory accessible by the DSP.

With the above specific example in mind, it is to be understood that the call progress monitor algorithm may be used anytime a telephone call is placed. Many devices exists which place outbound phone calls, all of which may use the call progress monitor. For example, the algorithm could be used in a "smart" telephone in which it would automatically redial a number if it hears a busy, without user key input. The operation of modems and burglar alarms which interact over the telephone lines if these machines are cognizant of the progress of an outbound telephone call.

APPENDIX

TABLE A1
SIGNAL DEFINITIONS

| Index | Name | MinSig | MaxTwist | MaxVar | P-Vector | | Tone Frequencies |
|---|---|---|---|---|---|---|---|
| 0 | DIALSIG | .70, | 5.5, | .05, | 1,1,0,0, | 0,0,0,0,0, 0 | 350 Hz + 440 Hz |
| 1 | RINGSIG | .70, | 5.5, | .05, | 0,1,1,0, | 0,0,0,0,0, 0 | 440 Hz + 480 Hz |
| 2 | BUSYSIG | .70, | 5.5, | .10, | 0,0,1,1, | 0,0,0,0,0, 0 | 480 Hz + 620 Hz |
| 3 | PAGER | .25, | 1.0, | .05, | 0,0,0,0, | 1,0,0,0,0, 0 | 1400 Hz |
| 4 | SIT1_LO | .50, | 1.0, | .05, | 0,0,0,0, | 0,1,0,0,0, 0 | 913.8 Hz |
| 5 | SIT1_HI | .50, | 1.0, | .05, | 0,0,0,0, | 0,0,1,0,0, 0 | 985.2 Hz |
| 6 | FAX_CNG | .50, | 1.0, | .05, | 0,0,0,0, | 0,0,0,1,0, 0 | 1100 Hz |
| 7 | SIT3 | .35, | 1.0, | .05, | 0,0,0,0, | 0,0,0,0,1, 0 | 1776.7 Hz |
| 8 | VOICE | .50, | 1.0, | .00, | 0,0,0,0, | 0,0,0,0,0, 1 | Voice IIR |
| 9 | SILENCE | | | | | | below threshold |
| 10 | UNKNOWN | | | | | | unknown |
| 11 | | | | | | | |

TABLE A2
GOERTZEL COEFFICIENTS

| | |
|---|---|
| 1.705281 | 350.0 Hz |
| 1.541027 | 440.0 Hz |
| 1.457938 | 480.0 Hz |
| 1.124168 | 620.0 Hz |
| -1.175571 | 1400 Hz Pager Cue Tone |
| 0.269978 | 913.8 Hz SIT 1 Low |
| 0.046491 | 985.2 Hz SIT 1 High |
| -0.312869 | 1100.0 Hz FAX Calling Tone |
| -1.878223 | 1776.7 Hz SIT 3 |

TABLE A3

Typical Voice Filter Coefficients
(Low Pass, 800 Hz Cutoff, 2 Sections)

| Section | A | B | C | D | E |
|---|---|---|---|---|---|
| 1 | .1373918 | .8906937 | -.6385397 | 6.359112E-02 | 1 |
| 2 | .3704903 | .5519813 | .160472 | 1.303988 | -1 |

Table A4
SITUATION DEFINITIONS

Situation 1 - Seize line after going off-hook or doing a hook-flash.

Rules:

Succeed on .5 sec of steady Dialtone.
    Fail on .1 sec (steady) of any other tone (.5 sec of voice)
    Timeout and fail after 6 seconds.

```
T_SDT SDT_0 =  0, "SDT_0 - Seize Line",
    {SE_K_SIGNAL,    1, "Dialtone-->SUCCESS", DIALTONE, SIGLIST, 0.50}, SE_K_SIGNAL,   -1, "Ringtone", RINGTONE, SIGLIST, 0.10
     SE_K_SIGNAL,   -2, "Busytone", BUSYTONE, SIGLIST, 0.10
     SE_K_SIGNAL,   -3, "SIT_1_Lo", SIT_1_LO, SIGLIST, 0.10
     SE_K_SIGNAL,   -4, "SIT_1_Hi", SIT_1_HI, SIGLIST, 0.10
     SE_K_SIGNAL,   -5, "SIT_2_Lo", SIT_2_LO, SIGLIST, 0.10
     SE_K_SIGNAL,   -6, "SIT_2_Hi", SIT_2_HI, SIGLIST, 0.10}
     SE_K_SIGNAL,   -7, "SIT_3", SIT_3, SIGLIST, 0.10
     SE_K_SIGNAL,   -8, "Voice", VOICE, SIGLIST, 0.50

SE_K_TIMEOUT, -19, "Timeout", 0,0, 6.00

SE_K_END,       0, "End"
```

Situation 2 - Detect phone pickup after dial-out

Rules:

Wait for up to 30 seconds of recognized ringing.

- declare event EVT_RING_DETECTED every ring

Recognize Pickup (via TT_Pickup):

- wait for .3 sec of steady voice
        - declare event EVT_VOICE_DETECTED
        - wait for .2 sec of silence
        - terminate w/Success Fail on recognizing:
        - ring failure (no ringing and no ringing2 -- see TT_RingingF/F2)
        - .1 sec of dialtone
        - .1 sec of busytone or weird busy pattern (see WEIRD_BUSY)
        - any SIT pattern, identify the SIT pattern.
        - timeout, after 30 seconds.

```
T_SDT    SDT_1 =  1, "SDT_1 - Detect Phone Pickup or Failure",
    SE_K_MONITOR,   1, "Pickup --> SUCCESS",  (INT24)&TT_Pickup,0

SE_K_MONITOR,  -FSMGBASE, "Ringing (Failure)",
                              (INT24)&TT_RingingF, 1
    SE_K_MONITOR,  -FSMGBASE, "Ringing2 (Failure)",
                              (INT24)&TT_RingingF2,2

SE_K_SIGNAL,   -1, "Dialtone",DIALTONE,SIGLIST, 0.10
    SE_K_SIGNAL,   -2, "Busytone",BUSYTONE,SIGLIST, 0.10
    SE_K_COMPLEX,  -3, "WEIRD-BUSY",(INT24)&WEIRD_BUSY SE_K_COMPLEX,  -4, "STP_IC",(INT24)&STP_IC},
    SE_K_COMPLEX,  -5, "STP_NC-B",(INT24)&STP_NCB
    SE_K_COMPLEX,  -6, "STP_NC-I",(INT24)&STP_NCI
    SE_K_COMPLEX,  -7, "STP_RO-B",(INT24)&STP_ROB
    SE_K_COMPLEX,  -8, "STP_RO-I",(INT24)&STP_ROI
    SE_K_COMPLEX,  -9, "STP_VC",(INT24)&STP_VC SE_K_TIMEOUT, -19, "Timeout-->bad call",0,0,30.0
    SE_K_END,       0, "End"
```

TABLE A5
COMPLEX PATTERN DEFINITIONS

```
        STP_NCB =                           Special Info Tone NC-B
"NC-B", SIGLIST, 0, DURATION(1.14)
 SIT_3,0,      .380,    "SIT_3/Long"
 SIT_2_HI,0,   .380,    "SIT_2_Hi/Long"
 SIT_1_HI,0,   .380,    "SIT_1_Hi/Long"
 CP_K_END,0,   0.00,    "End"

STP_IC =                           Special Info Tone IC
"IC", SIGLIST, 0, DURATION(0.928)
 SIT_3,0,      .380,    "SIT_3/Long"
 SIT_2_LO,0,   .274,    "SIT_2_Lo/Short"
 SIT_1_LO,0,   .274,    "SIT_1_Lo/Short"
 CP_K_END,0,   0.00,    "End"

STP_VC =                           Special Info Tone VC
"VC", SIGLIST, 0, DURATION(1.034)
 SIT_3,0,      .380,    "SIT3/Long"
 SIT_2_LO,0,   .274,    "SIT_2_Lo/Short"
 SIT_1_HI,0,   .380,    "SIT_1_Hi/Long"
 CP_K_END,0,   0.00,    "End"

STP_ROB =                          Special Info Tone RO-B
"RO-B", SIGLIST, 0, DURATION(1.034)
 SIT_3,0,      .380,    "SIT_3/Long"
 SIT_2_HI,0,   .380,    "SIT_2_Hi/Long"
 SIT_1_LO,0,   .274,    "SIT_1_Lo/Short"
 CP_K_END,0,   0.00,    "End"

STP_NCI =                          Special Info Tone NC-I
"NI-I", SIGLIST, 0, DURATION(1.14)
 SIT_3,0,      .380,    "SIT_3/Long"
 SIT_2_LO,0,   .380,    "SIT_2_Lo/Long"
 SIT_1_LO,0,   .380,    "SIT_1_Lo/Long"
 CP_K_END,0,   0.00,    "End"}]);
```

```
        STP_ROI =                        Special Info Tone RO-I
"RO-I", SIGLIST, 0, DURATION(1.034)
  SIT_3,0,    .380,   "SIT_3/Long"
  SIT_2_LO,0, .380,   "SIT_2_Lo/Long"
  SIT_1_HI,0, .274,   "SIT_1_Hi/Short"
  CP_K_END,0, 0.00,   "End"

WEIRD_BUSY =
"WEIRD-BUSY", PWRLIST, 0, DURATION(2.0)
  HIENERGY,0, .350,   "HIENERGY"
  SILENCE,0,  .650,   "SILENCE"
  HIENERGY,0, .350,   "HIENERGY"
  SILENCE,0,  .650,   "SILENCE"
  CP_K_END,0, 0.00,   "End"

FAST_BUSY =
"FASTBUSY", SIGLIST, 0, DURATION(1.0)
  SILENCE,0,  .300,   "SILENCE"
  BUSYTONE,0, .200,   "BUSYTONE"
  SILENCE,0,  .300,   "SILENCE"
  BUSYTONE,0, .200,   "BUSYTONE"
  CP K END,0, 0.00,   "End"

BUSY =
"BUSY", SIGLIST, 0, DURATION(2.0)
  SILENCE,0,  .500,   "SILENCE"
  BUSYTONE,0, .500,   "BUSYTONE"
  SILENCE,0,  .500,   "SILENCE"
  BUSYTONE,0, .500,   "BUSYTONE"
  CP_K_END,0, 0.00,   "End"
```

61

Table A6  Transition Tables

TT_RingingF (Signal List Ringing Failure)

T_TT TT_RingingF = "RingingF", SIGLIST, in SILENCE; .5 sec RINGTONE: goto state 2; timeout after 4.5 sec
1, RINGTONE,      0.5, 2, 0, "Detected Ringtone"
1, TT_K_TIMEOUT,  4.5, 0, 0, "Timeout waiting for ring"

declare EVT_DETECTED_RING
2, TT_K_DCLR_EVNT, 0.0, 3, EVT_DETECTED_RING,
                   "Declare Ring Detected"

in RING; .5 sec SILENCE: goto State 1; timeout after 2.5 seconds
3, SILENCE,       0.5, 1, 0, "Detected Silence"
3, TT_K_TIMEOUT,  2.5, 0, 0, "Timeout waiting for silence"
0, 0,             0.0, 0, 0, NULL TT_RingingF2 (Power List Ringing Failure)

T_TT TT_RingingF2 = "RingingF2", PWRLIST, in SILENCE; .5 sec of HIRENRGY: --> 2; timeout after 4.5 sec
1, HIRENRGY,      0.5, 2, 0, "Detected Hi Energy"
1, TT_K_TIMEOUT,  4.5, 0, 0, "Timeout waiting for Hi Raw Energy"

declare EVT_DETECTED_HIRENRGY; --> 3
2, TT_K_DCLR_EVNT, 0.0, 3, EVT_DETECTED_HIRENRGY,
                   "Declare HiREnrgy"

in HIRENRGY; .5 seconds of SILENCE: --> 1; timeout after 2.5 sec
3, SILENCE,       0.5, 1, 0, "Detected Silence"
3, TT_K_TIMEOUT,  2.5, 0, 0, "Timeout waiting for silence"

0, 0,             0.0, 0, 0, NULL

TT_Pickup transition table

T_TT TT_Pickup = "Pickup", SIGLIST, on .3 seconds of voice goto State 2, wait here forever
    1, VOICE,           0.3, 2, 0, "Detected Voice"

Declare voice detected event, goto State 3
    2, TT_K_DCLR_EVNT,0.0, 3, EVT_DETECTED_VOICE,
                 "Declare Voice Detected"

wait forever for .2 seconds of pause, then Terminate
    3, SILENCE,        0.2, 0, 0, "Detected Pause"

0, 0,                 0.0, 0, 0, NULL

Table A7

| Situation Running | Flag in Report | Meaning |
| --- | --- | --- |
| 1 | 1 | Dialtone |
| 1 | -1 | Ringtone |
| 1 | -2 | Busytone |
| 1 | -3 | SIT-1-LO |
| 1 | -4 | SIT-1-HI |
| 1 | -5 | SIT-2-LO |
| 1 | -6 | SIT-2-HI |
| 1 | -7 | SIT-3 |
| 1 | -8 | Voice |
| 1 | -19 | Timeout |
| 2 | 1 | Pickup |
| 2 | -FSMGBASE (-20) | Ring Failure |
| 2 | -1 | Dialtone |
| 2 | -2 | Busytone |
| 2 | -3 | Weird busy (cadence) |
| 2 | -4 | SIT IC |
| 2 | -5 | SIT NC-B |
| 2 | -6 | SIT NC-I |
| 2 | -7 | SIT RO-B |
| 2 | -8 | SIT RO-I |
| 2 | -9 | SIT VC |
| 2 | -19 | Timeout |

The above description is intended by way of example only, and is not intended to limit the present invention in any way, except as set forth in the following claims.

We claim:

1. A method for controlling a telephone call placed by an automatic dialing host machine which generates an outbound telephone call comprising the steps of:

operating the host machine to dial a telephone number of a receiving machine to receive a transmission from the host machine;

electronically detecting by the host machine a first or a second audio signal on the phone line which the hose machine dials; and automatically controlling the host machine to terminate the call and automatically perform another course of action depending on whether the first or second audio signal is detected wherein said step of automatically controlling comprises the step of causing said host machine to dial a telephone number of a second receiving machine.

2. The method of claim 1, wherein said second receiving machine comprises a facsimile machine.

3. The method of claim 1, wherein said step of automatically controlling further comprises the step of causing said host machine to display a message indicating that a wrong number was dialed.

4. The method of claim 1, wherein said host machine comprises a facsimile machine.

5. The method of claim 1, wherein said host machine comprises a modem.

6. The method of claim 1, wherein said receiving machine comprises a facsimile machine.

7. The method of claim 1, wherein said receiving machine comprises a modem.

* * * * *